US008675664B1

(12) United States Patent
Kamath et al.

(10) Patent No.: US 8,675,664 B1
(45) Date of Patent: Mar. 18, 2014

(54) PERFORMING SCALABLE L2 WHOLESALE SERVICES IN COMPUTER NETWORKS USING CUSTOMER VLAN-BASED FORWARDING AND FILTERING

(75) Inventors: Prakash Kamath, San Jose, CA (US); Apurva Mehta, Cupertino, CA (US); Debi Prasad Sahoo, San Jose, CA (US); Jagadish Grandhi, Mountain View, CA (US); Krishna Sankaran, Milpitas, CA (US); Moojin Jeong, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 121 days.

(21) Appl. No.: 13/197,506

(22) Filed: Aug. 3, 2011

(51) Int. Cl.
*H04L 12/28* (2006.01)
(52) U.S. Cl.
USPC ............... 370/395.53; 370/395.5; 370/395.6; 370/395.65
(58) Field of Classification Search
None
See application file for complete search history.

(56) References Cited

U.S. PATENT DOCUMENTS

| | | | |
|---|---|---|---|
| 6,639,901 B1 | 10/2003 | Katzri et al. |
| 7,653,933 B2 | 1/2010 | Miao |
| 7,856,509 B1 | 12/2010 | Kodeboyina |
| 7,856,659 B2 | 12/2010 | Keeler et al. |
| 8,072,984 B2 | 12/2011 | Chang |
| 8,121,126 B1 | 2/2012 | Moisand et al. |
| 2005/0013295 A1 | 1/2005 | Regan et al. |
| 2007/0253326 A1 | 11/2007 | Saha et al. |
| 2007/0253432 A1 | 11/2007 | Regale et al. |
| 2009/0122801 A1 | 5/2009 | Chang |
| 2009/0285215 A1* | 11/2009 | Kaippallimalil et al. ..... 370/392 |
| 2010/0208593 A1* | 8/2010 | Soon et al. ..................... 370/242 |
| 2011/0069711 A1* | 3/2011 | Jha et al. ................... 370/395.53 |

OTHER PUBLICATIONS

Bottorff, "MEF Technical Activities," PPT PowerPoint presentation, Metro Ethernet Forum, IEEE, Mar. 12, 2003, 33 pp.
Bottorff et al., "Carrier Scale Ethernet: Scaling Provider Ethernet," IEEE Communications Magazine, Sep. 2008, pp. 104-109.
IEEE P802.1ah-2008, "Standard for Local and Metropolitan Area Networks—Virtual Bridged Local Area Networks—Amendment 6: Provider Backbone Bridges," Institute of Electrical and Electronics Engineers, Inc., Mar. 26, 2008, 116 pp.
"Metro Ethernet," Wikipedia, last updated Sep. 17, 2010, 6 pp., http://en.wikipedia.org/wiki/Metro_Ethernet.
Sultan, Huawei Technologies, Inc., "PBBN in the Data Center," presented at the IEEE 802.1 Interim Meeting, Pittsburgh, PA, May 18-21, 2009, 3 pp.
U.S. Appl. No. 12/771,451, by Sanjiv Doshi, filed Apr. 30, 2010.
U.S. Appl. No. 12/827,464, by Sanjiv Doshi, filed Jun. 30, 2010.

(Continued)

*Primary Examiner* — Anez Ebrahim
(74) *Attorney, Agent, or Firm* — Shumaker & Sieffert, P.A.

(57) ABSTRACT

In general, techniques are described that facilitate scalable wholesale layer two (L2) connectivity between customers and service providers and a demarcation between the L2 wholesale network and one or more ISPs with which customers communicate L2 PDUs. In one example, a network device receives PDU having both a service identifier identifying a service virtual local area network (SVLAN) and a customer identifier identifying a customer VLAN (CVLAN). A virtual switch determines whether an entry of a L2 learning table is associated with both the service identifier and the customer identifier of the PDU. When no such entry exists, a VLAN learning module updates the L2 learning table to create a new entry that maps to a network device interface and is associated with both the service identifier of the PDU and a plurality of customer identifiers that includes the customer identifier of the PDU.

23 Claims, 7 Drawing Sheets

(56) References Cited

OTHER PUBLICATIONS

U.S. Appl. No. 12/901,985, by Krishna Sankaran, filed Oct. 11, 2010.
Response to Office Action dated Nov. 6, 2012, from U.S. Appl. No. 12/901,985, filed Feb. 6, 2013, 34 pp.
Office Action from U.S. Appl. No. 12/901,985, dated Nov. 6, 2012, 55 pp.
Notice of Allowance from U.S. Appl. No. 12/901,985, dated May 28, 2013, 20 pp.

* cited by examiner

PERFORMING SCALABLE L2 WHOLESALE SERVICES IN COMPUTER NETWORKS USING CUSTOMER VLAN-BASED FORWARDING AND FILTERING

TECHNICAL FIELD

The invention relates to electronic computer networks and, more specifically, to layer two (L2) computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers, etc.) are connected by one or more data link layer devices referred to as Ethernet switches. The Ethernet switches forward Ethernet frames, also referred to as L2 frames, L2 communications, L2 packet data units (PDUs), or L2 packets, to devices within the network. As the Ethernet switches forward the Ethernet frames, the Ethernet switches learn L2 state information for the L2 network, including media access control (MAC) addresses for the devices within the network and the physical interfaces of the Ethernet switches through which the devices identified by the MAC addresses are reachable. The Ethernet switches store the association between physical interfaces and MAC addresses in learning tables associated with each of their physical interfaces. When forwarding an individual Ethernet frame, an ingress interface of an Ethernet switch typically broadcasts the Ethernet frame to all of the other physical interfaces of the switch unless the Ethernet switch has previously learned the specific physical interface from which the destination MAC address specified in the Ethernet frame is reachable. In this case, the Ethernet switch forwards a single copy of the Ethernet frame out the associated physical interface. While referred to as interfaces in this disclosure, these interfaces are also commonly referred to as "ports."

Recently, network service providers have offered systems that provide L2 connectivity between multiple, geographically separate L2 customer networks. That is, the L2 customer networks may be interconnected by the service provider to provide L2 connectivity as if the L2 customer networks were directly connected. One mechanism by which network service providers provide L2 connectivity to their customers is Virtual Local Area Networks (VLANs). VLANs are a generic grouping mechanism for Ethernet frames that allow logical isolation of multiple L2 networks that share the same physical Ethernet interfaces. In other words, a service provider may associate different VLANs with different customers so that L2 traffic and L2 state information for the networks, e.g., learned MAC addresses, are logically separate for the customers. VLANs allow network switches and other infrastructure of the service provider to multiplex the L2 customer traffic over shared physical Ethernet interfaces. In this way, each VLAN provides a connection between devices assigned to the VLAN, and each of the VLANs may be considered an independent layer two (L2) network. A device assigned to one VLAN can communicate with other devices on that VLAN but may be unable to communicate with devices on a separate VLAN. Ethernet frames for different VLANs may be correctly forwarded within a network by appending a VLAN tag to the frames to designate the VLAN to which each frame belongs. Network switches within the service provider network forward the Ethernet frames using the MAC addresses and other state information learned for the specific VLAN.

In some networks, such as Metro Ethernet Networks (MEN), the network service provider contracts with a network operator to utilize existing infrastructure, such as copper telephone lines, to deliver data or Internet services to the customers of the network operator. Often, the service provider in this arrangement is referred to as an Internet service provider (ISP). Using the existing network infrastructure owned and operated by the network operator, the ISP provides data or Internet services to which one or more customers of the network operator may subscribe. In this arrangement, the network operator may contract with a number of different ISPs to provide customers of the network operator with a choice of services at competitive prices. This network operator is considered a wholesaler of layer two (L2) connectivity in that the network operator offers L2 connectivity for use by any ISP, where layers in this disclosure refer to layers of the Open Systems Interconnection (OSI) model.

While this arrangement between network operator and ISPs benefits the customers of the network operator in terms of competitive pricing (which increases the network operator's desirability from the customer perspective), such an arrangement often results in complications. For example, complications often arise when ISPs attempt to provide new L2 connectivity services in that these services do not scale well to accommodate the typically large number of customers of a network operator. For example, so called "E-LINE" service, also known as Virtual Leased Line (VLL) or Ethernet Private Wire Service (EPVS), provides point-to-point (P2P) connectivity. "E-LAN" service, also known as Virtual Private LAN Services (VPLS) and Transparent LAN Services, provides multipoint-to-multipoint (MP2MP) connectivity in which there is no communication restriction between devices. A third type of metro Ethernet service, referred to as "E-TREE" service, has recently been defined in which Ethernet communication is constrained to point-to-multipoint (P2MP). Often, the lack of scalability occurs because of limitations of network devices owned and operated by the network operator rather than the ISPs. The inability of the network operator to successfully enable these ISPs to provide these new services may reduce the number of ISPs willing to provide services for that network operator and drive customers to a competing network operator that can provide these services.

SUMMARY

In general, techniques are described that facilitate scalable wholesale layer two (L2) connectivity between customers and service providers and a demarcation between the L2 wholesale network provided by a network operator and one or more ISPs with which customers communicate L2 PDUs using the L2 wholesale network. These techniques address the manner in which network switches and other infrastructure devices of the network operator learn L2 state information for VLANs spanning the wholesale L2 network. In particular, this disclosure describes techniques by which network devices dynamically learn customer-specific VLAN identifiers for authenticated customers and filter L2 PDUs received from the ISPs based on the VLAN identifiers learned. As noted above, the VLANs are usually configured within a network of a network operator to virtually separate access nodes, such as a digital subscriber line access multiplexer (DSLAM) or cable modem termination system (CMTS), and each access node's customer devices from each other. These VLANs are often referred to as service or stack VLANs (SVLANs) to distinguish them from VLANs established for each customer, where these customer VLANs are often abbreviated as CVLANs.

In one example, interface routers within the operator network that interface with ISP routers may dynamically learn customer-specific VLAN identifiers for customers upon receiving L2 PDUs from an aggregation router that authenticates customers seeking to access retail services of an ISP. These interface routers may switch L2 PDUs between an MPLS core network of the operator and the retail networks of the ISP for the packets based only on VLAN identifiers of the packets, i.e., without regard to the destination MAC address of the packets. The interface routers manage L2 learning tables that store a record of whether the device has learnt a particular customer-specific VLAN identifier. Rather than maintaining full state information that specifies all MAC addresses learned for each customer-specific VLAN, the L2 learning table may store the record as a single bit within a bitmap for a range of contiguous customer-specific VLAN identifiers allocated to an aggregation router that receives downstream traffic from the interface router. Storing a record in a bitmap for learned customer-specific VLAN identifiers may significantly reduce the amount of storage media required for the learned state information in the L2 learning table. These techniques may therefore avoid overrunning limits on L2 learning tables and enable the network operator to prevent leaking (i.e., switching), to the core network, of VLAN-tagged PDUs that reach the operator network from the ISPs and have a customer-specific VLAN identifier that corresponds to an unauthenticated or non-existent customer.

In one example, a method comprises storing data defining a layer two (L2) learning table associated with a core-facing interface of a network switch that couples the network switch to an L2 service provider, wherein the L2 learning table includes a plurality of entries, each of the entries having a first portion specifying an SVLAN within the service provider core network and a bitmap having bits representing a range of CVLANs associated with the SVLAN, wherein each of the bits of the bitmap indicates whether a corresponding CVLAN has been learned and authenticated for the corresponding SVLAN on the core-facing interface of the network switch. The method also comprises receiving a first packet data unit (PDU), wherein the first PDU includes both a service identifier identifying an SVLAN of the first PDU and a customer identifier identifying a CVLAN of the first PDU. The method further comprises switching the first PDU when a corresponding bit of the L2 learning table for the SVLAN and CVLAN of the first PDU indicates the CVLAN of the first PDU has been learned and authenticated for the corresponding SVLAN of the first PDU on the core-facing interface of the network switch, and filtering the first PDU table when a corresponding bit of the L2 learning table for the SVLAN and CVLAN of the first PDU indicates the CVLAN of the first PDU has not been learned and authenticated for the corresponding SVLAN of the first PDU on the core-facing interface of the network switch.

In another example, a network switch includes a control unit having one or more processors, a network interface coupling the network switch to an L2 service provider, and a core-facing interface coupling the network switch to a service provider core network. The network switch also includes a layer two (L2) learning table of the control unit associated with the core-facing interface, wherein the L2 learning table includes a plurality of entries, each of the entries having a first portion specifying an SVLAN within the service provider core network and a bitmap representing a range of CVLANs associated with the SVLAN, wherein each of the bits indicates whether the CVLAN has been learned and authenticated for the corresponding SVLAN on the core-facing interface of the network switch.

In another example, a non-transitory computer-readable medium contains instructions. The instructions cause one or more programmable processors to store data defining a layer two (L2) learning table associated with a core-facing interface of a network switch that couples the network switch to an L2 service provider, wherein the L2 learning table includes a plurality of entries, each of the entries having a first portion specifying an SVLAN within the service provider core network and a bitmap having bits representing a range of CVLANs associated with the SVLAN, wherein each of the bits of the bitmap indicates whether a corresponding CVLAN has been learned and authenticated for the corresponding SVLAN on the core-facing interface of the network switch. The instructions also cause the programmable processors to receive a first packet data unit (PDU), wherein the first PDU includes both a service identifier identifying an SVLAN of the first PDU and a customer identifier identifying a CVLAN of the first PDU. The instructions also cause the programmable processors to switch the first PDU when a corresponding bit of the L2 learning table for the SVLAN and CVLAN of the first PDU indicates the CVLAN of the first PDU has been learned and authenticated for the corresponding SVLAN of the first PDU on the core-facing interface of the network switch, and filter the first PDU when a corresponding bit of the L2 learning table for the SVLAN and CVLAN of the first PDU indicates the CVLAN of the first PDU has not been learned and authenticated for the corresponding SVLAN of the first PDU on the core-facing interface of the network switch.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
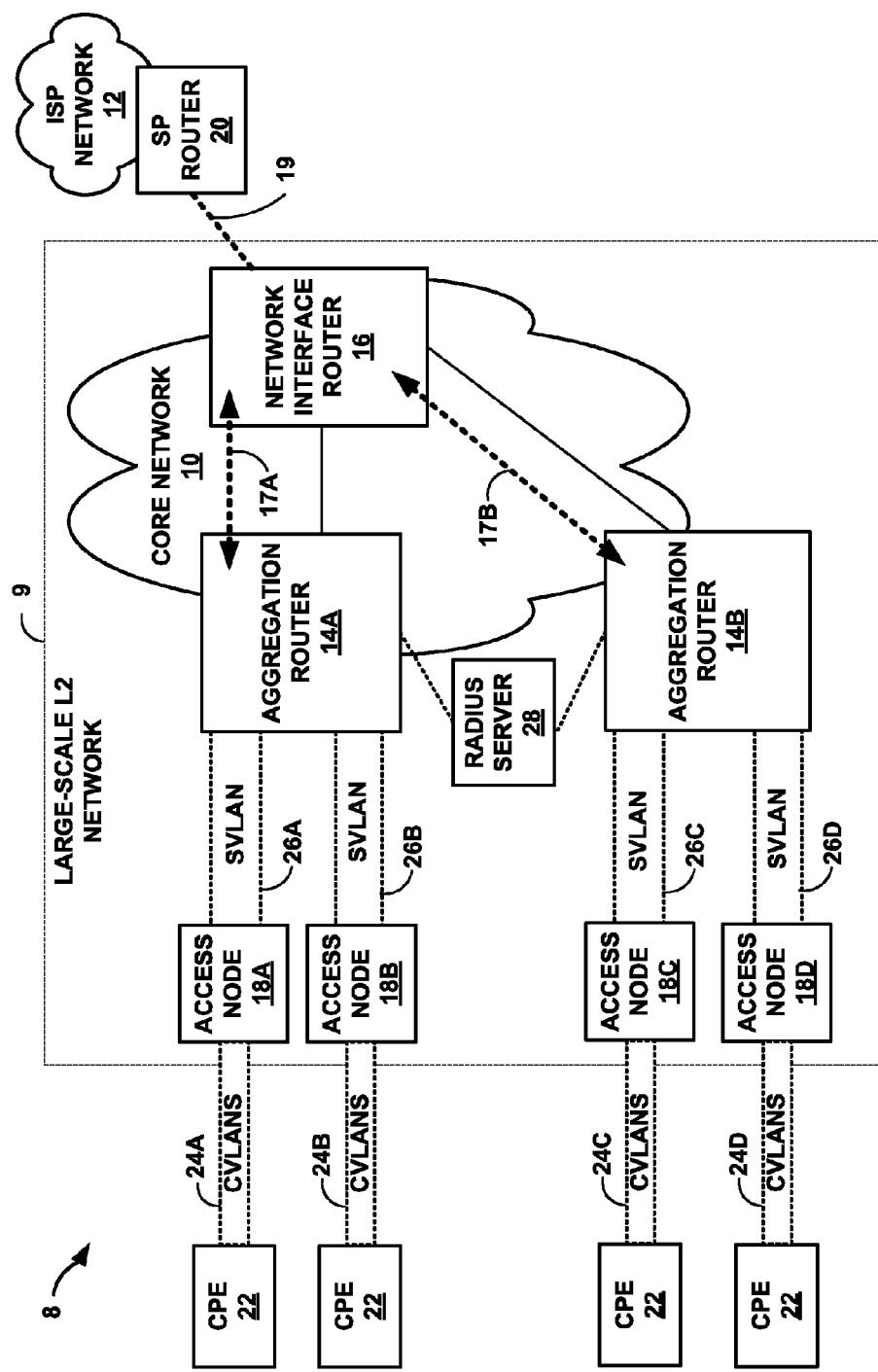
FIG. 1 is a block diagram illustrating an example of a network system that implements modified VLAN-learning techniques described in this disclosure.

FIG. 1 is a block diagram illustrating an example of a network system 8 that implements modified VLAN-learning techniques described in this disclosure. In the example of FIG. 1, network system 8 includes a large-scale L2 network 9, such as a metropolitan Ethernet network, and an Internet service provider (ISP) networks 12 provides services to customers of the L2 network. In the example embodiment, L2 network 9 includes access nodes 18A-18D ("access nodes 18"), aggregation routers 14A-14B, and a core network 10, which may represent a multi-protocol label switching (MPLS) network that implements one or more of a suite of MPLS protocols, such as a Resource Reservation Protocol (RSVP) and a Label Distribution Protocol (LDP). Core network 10 may implement one of the MPLS protocols to provision label switched paths (LSPs). Often, core network 10 is a layer three (L3) network that implements a L3 protocol, such as an Internet Protocol (IP). In this L3 network, the LSPs represent L2 paths or other tunnels through the L3 network represented by core network 10.

Aggregation routers 14 represent network devices that may implement L2 switching functionality as well as the one or more MPLS protocols noted above and L3 network protocols, such as IP. When implementing one or more of these MPLS protocols, each of aggregation routers 14 may be characterized as a label switching router (LSR), or a label edge router (LER) to denote termination of LSPs by the aggregation router. Aggregation routers 14 are generally referred to as aggregation routers because they aggregate traffic forwarded by a plurality of access nodes, such as access nodes 18 shown in the example of FIG. 1, for delivery into core network 10. Each of aggregation routers 14 may be a Broadband Remote Access Server (B-RAS), a Broadband Services Router (BSR), or another L3 router having simultaneous L2 switching functionality. Aggregation routers 14 may each in some instances be an L2 switch that connects to network interface router 16 over an L2 network, rather than core network 10. Aggregation routers 14 and access nodes 18 may exchange L2 traffic over an L2 aggregation network (not shown in FIG. 1 for ease of illustration). Network interface router 16 is an intermediate network device that provides an egress from core network 10 and represents a network-to-network interface (NNI) provider edge (PE) router that provides an interface between core network 10 and ISP networks 12.

Throughout core network 10, one or more pseudowires (PWs) may be defined to interconnect aggregation router 14 and network interface router 16. Generally, a PW represents a bidirectional path that emulates a service not natively supported by the underlying network. For example, assuming core network 10 represents a L3 network, a PW may be provisioned to emulate certain types of L2 connectivity (e.g., L2 Ethernet connectivity) despite that this L3 network may not natively support this form of L2 connectivity. In the example of FIG. 1, two PWs 17A, 17B ("PWs 17") have been provisioned to emulate L2 Ethernet connectivity between respective aggregation routers 14 and network interface router 16. Each of PWs 17 are associated ISP networks 12 in a service instance of network interface router 16 that also connects to SP router 20 of ISP network 12 via attachment circuit 19. Attachment circuit 19 may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. Attachment circuits 20 may each comprise a direct link or an access network.

Each of PWs 17 may be carried by two unidirectional LSPs established over core network 10. In this example, PW 17A connects aggregation router 14A to ISP network 12 via network interface router 16, and PW 17B connects aggregation router 14A to ISP network 12 via network interface router 16. Often, PWs 17 are assigned or associated with an ISP to enable ISP networks 12 access to particular customers of a network operator that operates an operator network, which comprises core network 10 and access nodes 18 in the example of FIG. 1.

ISP network 12 represents a network owned and operated by an Internet service provider. Typically, ISP network 12 represents an L3 network that implements an L3 protocol, such as the above-noted IP, to forward data units referred to as packets from source devices to destination devices. ISP network 12 may form part of a public network, such as the Internet, that is publicly accessible. ISP network 12 includes SP routers 20 representing a L3 network device that implements a L3 protocol, such as IP, to route the above mentioned packets to other network devices of ISP network 12. While SP router 20 represents an L3 network device, SP router 20 may also provide or otherwise implement L2 switching functionality so as to provide L2 services to customers.

While illustrated for simplicity as connecting to a single ISP network 12 via attachment circuit 19, network interface router 16 may connect to a plurality of ISP networks that each connects to network interface router 16 using a different attachment circuit associated with a separate service instance of network interface router 16. Each service instance may switch L2 packets to/from aggregation routers 14 via respective pseudowires for the service instance.

As further shown in the example of FIG. 1, network system 8 also includes access nodes 18 by which customer premises equipment (CPE) 22 connect to L2 network 9. Each of access nodes 18 represents a network device (such as a digital subscriber line access modem (DSLAM) or a cable modem termination system (CMTS)) that aggregates L2 traffic originated by CPE 22 for delivery upstream to one of aggregation routers 14. For example, access node 18A aggregates L2 traffic from CPE to aggregation router 14A. Access nodes 18 generally implements L2 switching functionality to facilitate the delivery of traffic to and from CPE 22. Customer premises equipment 22 represent devices located at the premises of different customers of a network operator that owns and operates not only core network 10, but also the access networks in which access nodes 18 reside and by which CPE 22 connect to the access nodes (these access networks are not explicitly shown in the example of FIG. 1 for ease of illustration). Examples of CPE 22 include customer-owned telephones, routers, switches, residential gateways such as DSL or cable modems, set-top boxes, private branch exchanges (PBXs), an Internet-enabled television, or another device capable of accessing an L2 network. Each of CPE 22 shown in FIG. 1 may represent a plurality of CPE for respective customers.

As noted above, a single network operator may own and operate L2 network 9 including core network 10, aggregation routers 14, network interface router 16, and access nodes 18. The network operator may configure and operate this network as a metropolitan Ethernet network (MEN) to provide L2 connectivity between various customers and ISP networks 12.

Certain L2 services provided by the ISPs require L2 connectivity between different L2 customer networks using the same access network and/or the same aggregation network. To enable ISPs to provide these services, the network operator may virtually segregate the operator network using virtual local area networks (VLANs). The network operator may assign a customer VLAN (CVLAN) to each customer that employs one of CPE 22. In the example of FIG. 1, VLANs are generally denoted as dashed-lined boxes/tunnels. CVLANs 24A-24B each represents one or more CVLANs by which respective access nodes 18 may exchange packets with a particular customer. For example, access node 18A exchanges L2 PDUs with one or more CPE 22 using respective CVLANs of CVLANs 24A.

By assigning different CVLANs of CVLANs 24A-24D ("CVLANs 24") to various CPE 22, the network operator may enable ISPs to uniquely identify and distinguish between the different customer networks in which CPE 22 reside. In some instances, CVLANs 24 that connect to different access nodes 18 may have identical identifiers. For example, CVLAN 24A and CVLAN 24D may include identical CVLAN identifiers (CVIDs), though these CVLANs remain distinguishable by the respective access node 18 that resides in the CVLAN because the CVIDs are unique to each access node.

Each CVID may be drawn from a CVID space defined by a 12-bit inner VLAN tag of L2 traffic. Given that each customer network may be uniquely identified, the network operator can provision L2 connectivity between any two or more of the uniquely identified customer networks and thereby provide the services that rely on such connectivity.

To provision this L2 connectivity in the operator network, which again is represented by core network 10 and the aggregation network in the example of FIG. 1, the operator further segregates L2 network 9 into what are referred to as service or stack VLAN (SVLANs). Conventional techniques for SVLAN identifier (SVID) allocation may associate each of access nodes 18 with a particular SVID and bridge L2 traffic to the access nodes with aggregation routers 14 based on the SVID for the access nodes.

To facilitate techniques described herein, the operator allocates SVIDs to one or more access nodes 18 and also allocates contiguous, non-overlapping ranges of CVIDs for each SVID to one or more access nodes 18. In other words, a plurality of access nodes 18 connected to aggregation routers 14 may be associated with the same SVLAN, and the operator allocates access nodes that are associated with the same SVLAN a non-overlapping range of CVIDs. As used herein, reference to "non-overlapping" or "no overlap of" identifiers means that each identifier is unique within a context and that no device within L2 network 9 is allocated the same identifier for the context.

For example, access nodes 18A, 18B, and 18C may each be allocated or otherwise associated with one or more contiguous, non-overlapping ranges of CVIDs for a single SVID. In such an example, SVLANs 26A, 26B, and 26C each have the same SVID, while CVLANs 24A, 24B, and 24C have no overlapping CVIDs. However, any sub-combination of SVLANs 26A-26D ("SVLANs") may have different or the same SVIDs. For example, SVLAN 26A, 26D may share an SVID, while SVLAN 26B, 26C each have an SVID that is different from the other and from the SVID for SVLAN 26A, 26D. Similarly, SVLAN 26A, 26B may share an SVID and, because corresponding access nodes 18A, 18B may share an aggregation to aggregation router 14A, these access nodes may effectively reside in the same SVLAN. In this way, the techniques relax the requirement for a 1:1 association between each of access nodes 18 and an SVID, and the techniques allow aggregation routers 14 to aggregate L2 traffic from additional access nodes 18 because the operator may associate a single SVID to a plurality of access nodes, with each of the access nodes associated with a range of CVIDs for the single SVID. Access nodes 18 continue to bridge L2 traffic based on the respective CVLANs 24A. An (SVID, CVID) pair allocated to a particular one of CPE 22 thus uniquely identifies and distinguishes the CPE from all other CPE 22 having L2 connectivity with L2 network 9 and, in effect, defines an attachment circuit for the CPE to the aggregation router bridging instance. Aggregation routers 14 bridge L2 traffic based on the (SVID, CVID) pair for the L2 traffic.

A new type of point-to-point Ethernet service referred to as an Ethernet line (ELINE) service enables a form of point-to-point L2 connectivity between two different and often geographically separate customer networks. Assuming the customer that connects to L2 network 9 using one of CPE 22 has subscribed to this ELINE service that is provided by the ISP that owns and operates ISP network 12 to connect to another customer network accessible by ISP network 12, the network operator provisions access node 18A with a range of CVLANs 24A for SVLAN 26A. Access node 18A, in turn, uses one of CVLANs 24A to exchange L2 PDUs with the subscribed CPE 22.

Given that SVLAN 26A assures dedicated L2 connectivity between CVLANs 24A and CVLANs accessible from ISP network 12, ISP network 12 may then provision or otherwise configure an ELINE service for this SVLAN 26A. Using this ELINE service, the subscribed CPE 22 may communicate with the other customer devices of the remote CVLAN also associated with SVLAN 26A such that from the perspective of the subscribed CPE 22, or any other device within the one of CVLANs 24A for the subscribed CPE 22, it appears as if the subscribed CPE 22 and the remote customer device are directly connected via an Ethernet network. In any event, the network operator may provision, establish or otherwise configure multiple SVLANs, such as SVLANs 26, to enable the delivery of these types of L2 services between the ISPs and CPE 22. Other examples of Ethernet services include E-LAN and E-TREE.

Conventionally, L2 networks switch L2 PDUs, which are examples of an L2 packet or an L2 frame, rather than route data units as is the case in L3 networks. Each device of a L2 network that implements L2 switching, including access nodes 18, aggregation routers 14, and network interface router 16, discovers or otherwise learns how to switch these PDUs during the normal course of receiving and switching traffic. To illustrate, assume that a CPE 22 originates and sends a PDU upstream to access node 18A, where this PDU includes a source L2 address, referred to as a source media access control (MAC) address, that uniquely identifies the sender of the packet and a destination L2 address, referred to as a destination MAC address, that uniquely identifies the destination to which the PDU is directed. Access node 18A stores data defining a L2 learning table that includes entries associating a unique L2 address, referred to as a media access control (MAC) address, with interfaces or physical ports of access node 18A. Access node 18A receives this PDU via one of its interfaces and parses the source MAC address of the PDU that uniquely identifies the CPE 22. Using this parsed MAC address as a key, access node 18A performs a lookup in the L2 learning table. If access node 18A has not yet learned or discovered this source L2 address, access node 18A creates an entry in the L2 learning table that associates the L2 source address with the interface over which aggregation node 18 received this PDU, thereby effectively learning or discovering the location of the CPE 22 with respect to the interfaces of access node 18A.

To switch this PDU from CPE 22, access node 18A parses the destination L2 address from the packet and performs a lookup in the L2 learning table to identify one of its interfaces or physical ports to which it should switch the received PDU. If access node 18A has not yet learned of this destination address in the manner described above, or in other words, the lookup returns a null entry, access node 18A broadcasts this packet via all of its interfaces except for the one over which it received the PDU. However, if access node 18A has previously learned of this destination L2 address, access node 18A switches the PDU to the interface identified in the located entry of the L2 learning table, whereupon this interface proceeds to forward the L2 packet on to the destination device.

In the context of L2 wholesale, the general learning outlined above is modified slightly in that learning occurs only with respect to a given VLAN, or more particularly, a given VLAN tag that identifies the VLAN. To illustrate, consider the example above where one of CVLANs 24A in which the CPE 22 resides is associated with SVLAN 26A in order to deliver a point-to-point ELINE service. In this example, access node 18A learns only within the context of SVLAN 26A and stores data defining a separate L2 learning table solely for use in learning the location of customer devices associated with customer networks identified as belonging to SVLAN 26A. In this manner, L2 learning proceeds as outlined above in the limited context of SVLAN 26A.

The L2 learning described above is also performed by each L2 device in the network, including aggregation routers 14 and network interface router 16. While access node 18A may be required to learn within the context of SVLAN 26A and thereby limit the number of entries in its L2 learning table to the number of devices included within of SVLAN 26A, the number of devices accessible from each device increases the further upstream toward ISP networks 12 any given device is positioned. In other words, as traffic is aggregated first by access nodes 18 and then by aggregation routers 14, the number of devices that originate this traffic increases, which directly impacts the number of source L2 MAC addresses each successive upstream device must learn or discover and store to a L2 learning table.

For example, in large operator networks, aggregation routers 14 may couple to a number of different access nodes similar to access nodes 18, where each of these access nodes may service a number of large customer networks. Network interface router 16 may couple, as illustrated, to multiple aggregation routers 14. At each level in this aggregation network, traffic is aggregated and sent upstream to another device. Access node 18 may have to learn of potentially thousands of L2 addresses, while aggregation router 14 may couple to a number of access nodes, such as a few tens of access nodes, each of which provides access to thousands of customer devices, meaning that each of aggregation routers 14 is required to learn tens of thousands of L2 addresses using convention techniques. Meanwhile, network interface router 16 couples to potentially tens of aggregation routers, each of which provides access to potentially tens of thousands of customer devices, meaning network interface router 16 may be required to learn of potentially hundreds of thousands or possibly millions of L2 addresses.

As the Ethernet protocol was generally employed in private networks that are generally much smaller in terms of the number of customer devices than a public network such as the Internet, many network devices, such as network interface router 16, only provide for limited space to store data defining L2 learning tables. Often, this space is limited because L2 learning occurs in what is referred to as a data path of these devices, which is usually implemented predominately as dedicated hardware units, such as field programmable gate arrays (FPGAs) and application-specific integrated circuits (ASICs), that are specifically designed to provide for efficient switching of L2 packets and routing of L3 packets. As L2 Ethernet connectivity has expanded in application to include new services, such as the ELINE service mentioned above, a point-to-multipoint Ethernet tree (ETREE) service and a multipoint-to-multipoint Ethernet large area network (ELAN) service, the number of L2 addresses an upstream device has been required to learn has grown significantly to the point where these devices, such as network interface router 16, do not provide sufficient memory within the dedicated hardware units to store the L2 learning tables of sufficient size to learn all of these addresses. As a result, these devices may be unable to learn all of the addresses, which may cause these devices to fail or act erratically. For example, network interface router 16, upon overrunning its storage space allocated for storing its L2 learning tables, may begin broadcasting packets via all of its interfaces except for the interface over which the packet was received despite having received a packet from this device before. Network interface router 16 may, in this instance, be unable to learn addresses and for these addresses it cannot learn, repeatedly send these packets via broadcast. Broadcasting packets consumes significant bandwidth and other network resources, which may impact if not prevent delivery of services by ISP network 12 or other ISP networks connected to network interface router 16 (in various embodiments).

In accordance with the techniques of this disclosure, network interface router 16 performs a form of modified L2 learning, where instead of learning based on source L2 addresses, network interface router 16 may learn using a combination of SVLAN and CVLAN tags only. Network interface router 16 stores associations between (SVID, CVID) pairs and the aggregation routers 14 that serves the access nodes 18 to which the network operator has assigned the (SVID, CVID) pair. That is, network interface router 16 stores associations between learned (SVID, CVID) pairs and the corresponding aggregation routers 14 from which the network interface router 16 receives PDUs double-tagged with the (SVID, CVID) pairs. In this way, network interface router 16 learns the downstream (i.e., toward CPE 22) interface for PDUs received on attachment circuit 19 without storing any L2 addresses and associations between these L2 addresses and a downstream interface.

To illustrate, assume that network interface router 16, which is representative of an upstream intermediate device positioned between aggregation routers 14 and service provider router 20, stores data defining an L2 learning table. This learning table includes entries that are each associated with a service/customer label combination, such as an SVLAN/CVLAN tag combination, that respectively identifies different CVLANs that transmit/receive traffic by various SVLANs and further define an association between interfaces of the upstream intermediate device and the corresponding SVLAN/CVLAN tag combination. As described in more detail below, by storing associations between SVLAN/CVLAN pairs (e.g., (SVID, CVID) pairs) and interfaces rather than source L2 addresses and interfaces, network interface router 16 may greatly reduce the number of entries in the L2 learning table and avoid overrunning or exceeding the limited storage space provided in the dedicated hardware that implements the data path. In this respect, the techniques may facilitate scalability as network interface router 16 may enable L2 connectivity for a large number of SVLANs, each carrying traffic for a large number of CVLANs comprising potentially thousands of customers without entering what may be referred to as an overload condition.

As noted above, the network operator has previously allocated each of access nodes 18 with a non-overlapping range of CVIDs within the context of an SVID. For example, access node 18A is allocated and receives L2 PDUs tagged with CVIDs for CVLANs 24A. To illustrate how this overload condition may be reduced or mitigated entirely, assume access node 18A receives an L2 PDU that includes a CVLAN tag with a CVID for one of CVLANs 24A. The L2 PDU additionally includes a destination L2 address identifying a customer device positioned in a CVLAN accessible from ISP network 12. Access node 18A attaches, to the PDU, an SVLAN tag with an SVID for SVLAN 26A that associates access node 18A with aggregation router 14A, and outputs the modified PDU toward aggregation router 14A.

When aggregation router 14A receives the PDU from access node 18A on SVLAN 26A, it determines whether it has learned the CVLAN/SVLAN tag combination specified in the L2 packet. Aggregation router 14A may store data defining a table that associates (SVID, CVID) pairs with downstream interfaces toward access nodes 18. Aggregation router 14A identifies the (SVID, CVID) pair for the PDU and uses the pair as an index into the table. If an entry is defined for this pair, aggregation router 14A assumes the user of the CPE for this pair is currently authenticated and forwards the PDU based on the SVID, as further described below. If no entry is defined for this pair, aggregation router 14A authenticates the user based on information stored in the PDU, such as the source L2 MAC address, as well as any other authentication information provided in the PDU.

As shown in the example of FIG. 1, aggregation routers 14 may couple to a Remote Access Dial-In User Service (RADIUS) server 28 that implements a RADIUS or other AAA protocol for performing authentication, authorization and accounting. RADIUS server 28 may store data defining certain provisioning information for (SVID, CVID) pairs (i.e., for CPE 22), such as an association between an (SVID, CVID) and a particular ISP network, such as ISP network 12. Aggregation routers 14 interface with RADIUS server 28 to determine whether the CPE 22 with the (SVID, CVID) of the PDU is authorized to access core network 10, providing RADIUS server 28 with the (SVID, CVID) of the PDU. Assuming authorization is provided by RADIUS server 28, such authorization includes data defining an association between the SVID of the PDU and one of PWs 17, which as noted above have been configured to be associated with ISP network 12.

Aggregation router 14A may store data defining an additional table for the core-facing interface that associates SVIDs with upstream interfaces, such as pseudowires through core network 10 to network interface router 16. In this example, the authorization information associates the SVLAN tag identifying SVLAN 26A with PW 17A (FIG. 1 illustrating only a single ISP network 12). Upon receiving the authorization information, aggregation router 14A stores an entry to the additional table for the core-facing interface to associate the SVID of SVLAN 26A for the received PDU with PW 17A. Aggregation router 14A then switches the received PDU via PW 17A to network interface router 16, where such switching generally involves appending a pseudowire label to the PDU that identifies the PDU as corresponding to PW 17A.

Network interface router 16 receives this L2 PDU from aggregation router 14 with one of its interfaces via PW 17A. Again, this PDU includes an SVLAN tag that identifies this packet as corresponding to SVLAN 26A and a CVLAN tag identifying one of CVLANs 24A reachable from aggregation router 14A. Network interface router 16 then implements the techniques described in this disclosure to map the (SVID, CVID) pair of the received PDU to the interface on which the PDU was received (in this example, the interface corresponding to PW 17A). Network interface router 16 parses the SVLAN tag and CVLAN tag from the received L2 packet to determine the (SVID, CVID) pair, which network interface router 16 uses as a key to access an L2 learning table for a service instance for ISP network 20 to determine whether any one of the entries of the learning table is associated with the (SVID, CVID) pair.

Assuming network interface router 16 has not previously learned the (SVID, CVID) pair or, having been previously learned, has expired, network interface router 16 determines that none of the entries in the learning table are associated with the (SVID, CVID) pair. In response to this determination, network interface router 16 updates the learning table to create a new entry and associates this new entry with the SVLAN tag associated with SVLAN 26. In addition, network interface router 16 associates this new entry with a well-defined range of CVIDs for the SVID and "packs" learned CVIDs that fall within the range into the entry in order to identify a particular (SVID, CVID) pair as learned by the service instance of network interface router 16 for SP router 20. Network interface router 16 then defines an association for this new entry that associates the one of the interfaces of network interface router 16 that received this L2 packet and the new entry. In some instances, network interface router 16 modifies a current entry to indicate that the (SVID, CVID) pair is learned by the service instance of network interface router 16 for SP router 20.

In this way, entries of the learning table map well-defined ranges of CVIDs for an SVID to interfaces and "pack" learned CVIDs that fall within the ranges into the respective entries in order to identify a particular (SVID, CVID) pair as learned by the service instance of network interface router 16 for SP router 20. As a result, network interface router 16 avoids creating a new entry for each SVID, CVID pair, which would otherwise potentially result in over 16 million entries that may overload the capacity of the network interface router 16 to store and switch accordingly. Rather, network interface router 16 creates an entry for a range of CVIDs. In some instances, the range of CVIDs may correspond to a range defined by individual CVLANs 24 each assigned to a particular one of access nodes 18. Network interface router 16 in such examples, by creating an entry for a range of CVIDs that correspond to one of CVLANs 24, effectively creates an entry that maps the range to the customer-facing interface by which the corresponding one of access nodes 18 for the CVLANs is reachable. For example, network interface router 16, upon receiving an L2 PDU via aggregation router 14A via access node 18A, creates a learning table entry that maps CVIDs for CVLANs 24A to PW 17A on which network interface router 16 received the PDU.

When the network operator allocates ranges of CVIDs for an SVID to access nodes 18 such that each range is of equal size, network interface router 16 may determine the bounds of any particular range of CVIDs based on the size of the ranges. Where the network operator allocates ranges of CVIDs in blocks of 64, for example, a first range of CVIDs is bounded by (0, 63), a second range of CVIDs is bounded by (64, 127), and so forth. To continue the example above, suppose network interface router 16 determines the L2 PDU received by network interface router 16 via aggregation router 14A via access node 18A has SVLAN/CVLAN tags defining a (SVID, CVID) pair of (1, 65). Network interface router 16 creates, if necessary, a new entry for the learning table that maps SVID=1 and CVID range=(64, 127) to PW 17A, because CVID=65 falls within the range defined by (64, 127).

The entry effectively maps the entire range of CVIDs within (64, 127) for SVID=1 to PW 17A.

However, in many cases at least one CVID within a mapped range of CVIDs has not been learned by network interface router 16, indicating the corresponding one of CPE for the (SVID, CVID) has not been authenticated and does not have access to core network 10. In accordance with techniques described herein, network interface router 16 stores a flag or other data structure for each CVID in a CVID range to indicate whether the particular CVID is learned by the network interface router. Network interface router 16 may aggregate the flags for a CVID range of a learning table entry into a bitmap that stores a single bit indicating the status of each flag. Put another way, the bitmap "packs" indications of whether each of the CVIDs within a range of CVIDs is learned into a single entry for the range. A set bit (e.g., bit value=1) may indicate the CVID has been learned (i.e., received from an authenticated downstream CPE 22), while a cleared bit (e.g., bit value=0) may indicate the CVID has not been learned. When network interface router 16 receives PDUs via its customer-facing interfaces (i.e., from aggregation routers 14 and access nodes 18) that have (SVID, CVID) pairs associated with learning table entries already created, the network interface router may simply set the appropriate bit within the bitmap to indicate the (SVID, CVID) combination has been learned. Because the network operator allocates access nodes 18 contiguous, non-overlapping CVID ranges, the customer-facing interface is typically the same for all CVIDs within a CVID range for a particular SVID, and the customer-facing interface reaches the access node that is allocated the CVID range.

In this way, network interface router 16 performs a form of modified L2 learning to learn or otherwise determine associations between (SVID, CVID) ranges and interfaces. Network interface router 16 does not, in this context, learn or otherwise determine associations between source L2 MAC addresses and interfaces. Considering that each of CVLANs 24 may each include hundreds if not thousands of customer devices, each of which is assigned a different unique L2 MAC address, network interface router 16 avoids learning potentially thousands of L2 MAC addresses by only learning based on (SVID, CVID) ranges. As there may be only a few hundred-thousand possible (SVID, CVID) ranges, depending on the size of the ranges within the CVID space, network interface router 16 need only store at most those few hundred-thousand different entries in its L2 learning table rather than the possibly millions of entries that may otherwise be required if network interface router 16 performed conventional L2 learning or learning based on each (SVID, CVID) pair. Consequently, network interface router 16 avoids overrunning the memory allocated in its data plane for storing L2 learning tables, which facilitates network operation by avoiding failure of network interface router 16 and/or the erratic behavior of repeatedly broadcasting packets.

While performing this modified learning in accordance with the techniques described in this disclosure, network interface router 16 switches PDUs using learning tables for the ISP networks. In the upstream direction, network interface router 16 may be statically provisioned by the network operator to associate the SVLAN tag identifying SVLANs 26 to attachment circuit 19. This interface of network interface router 16 then forwards the received PDUs to SP router 20A via attachment circuit 19, which proceeds to forward this packet to its intended destination in the public network or, if this packet corresponds to one of the ELINE, ETREE or ELAN service, to a member customer network of this service.

As an example of how this form of modified learning is implemented in the downstream direction from network interface router 16 to CPE 22, consider that an L2 PDU from the public network accessible by ISP network 12 may arrive at SP router 20 having an identified L2 destination address of a customer network reachable by one of CVLANs 24A. SP router 20 appends the appropriate SVLAN tag that identifies SVLAN 26A and CVLAN tag that identifies the one of the CVLANs 24A based on this destination address. SP router 20 forwards this PDU to network interface router 16. Upon receiving this PDU, network interface router 16 performs a lookup based on the (SVID, CVID) pair of the SVLAN and CVLAN tags in an L2 learning table for the core-facing interface for the service instance corresponding with which attachment circuit 19 is associated.

If network interface router 16 determines the (SVID, CVID) pair is not indicated by the L2 learning table as having been learned, the network interface router drops the PDU. This may advantageously prevent leakage of PDUs into core network 10 for unauthenticated or non-existent subscribers. If an entry of the L2 learning table indicates the (SVID, CVID) pair is learned, however, the network interface router 16 switches the PDU to the downstream interface (e.g., one of PWs 17) mapped to the (SVID, CVID) pair by the entry. Network interface router 16 sends the PDU via the downstream interface to one of aggregation routers 14, which receives the PDU and performs a lookup in its L2 learning tables using the (SVID, CVID) pair as a key.

Aggregation routers 14 may also learn in this downstream direction as well and install an association between the SVID of the received packet and its interface associated with PW 17A that received this packet. The aggregation router 14 that received the PDU switches the PDU to the interface determined via the lookup. If an interface is not identified for the (SVID, CVID) pair, the aggregation router 14 drops the packet. Assuming such an interface was identified via the lookup, the aggregation router switches the PDU to this interface, which proceeds to forward this packet to one of access nodes 18 that resides in the SVLAN for the SVID of the SVLAN tag of the PDU. The access nodes 18 may determine whether they have been allocated the SVID, CVID range in which the (SVID, CVID) pair for the PDU falls. In other words, access nodes 18 determine whether PDU is destined for an L2 device reachable by its corresponding one of CVLANs 24. For the one of access nodes 18 for which this is true, the access node then forwards this packet to the interface for the CVLAN identified by the CVID, popping the SVLAN tag at the ingress interface and transmitting the packet with only the CVLAN tag to the CVLAN.

Figure 2A:
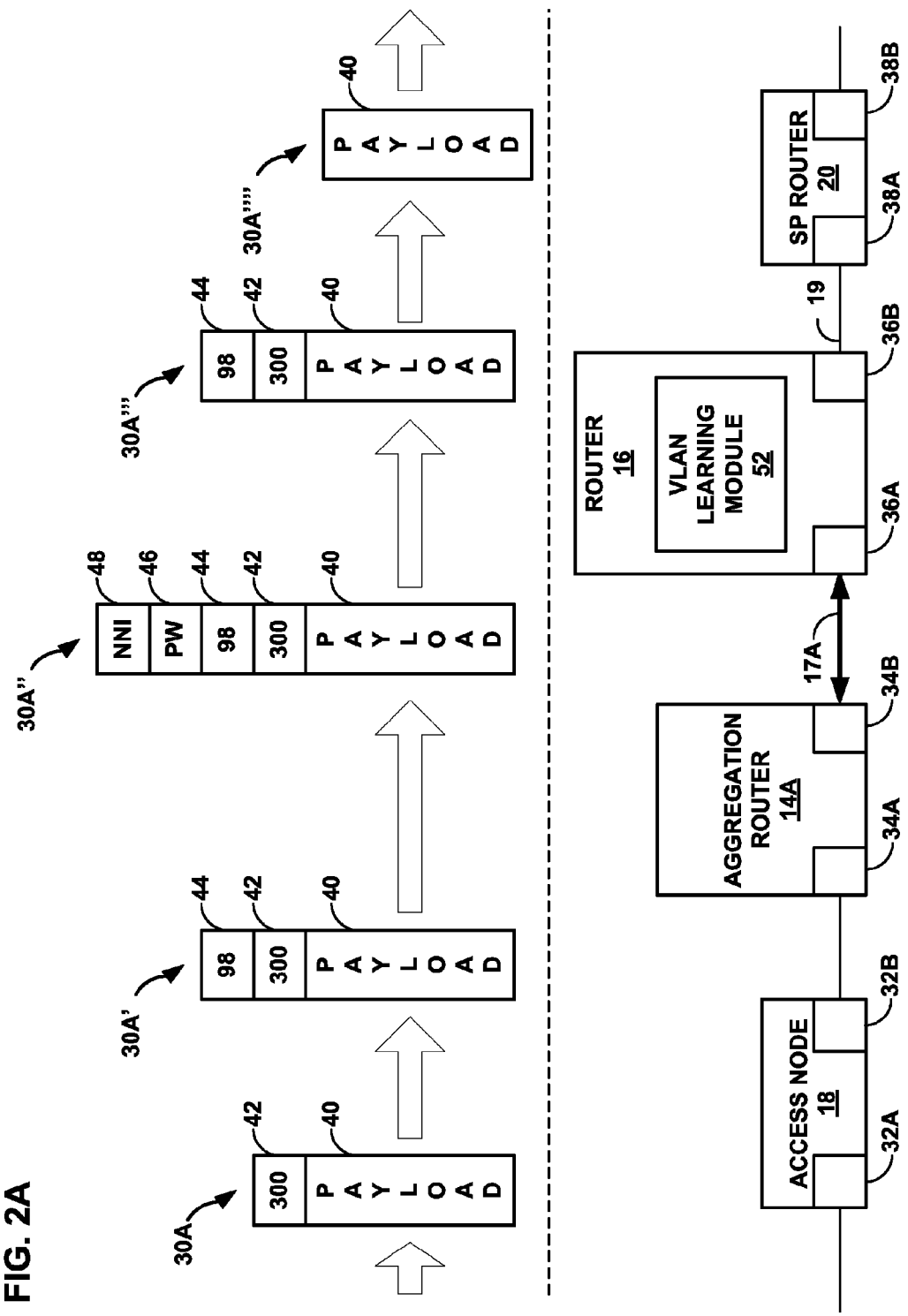
FIGS. 2A-2B are block diagrams illustrating example operations of device of the network system of FIG. 1 in further detail to perform modified VLAN-learning techniques and switch PDUs using techniques described herein.
Figure 2B:
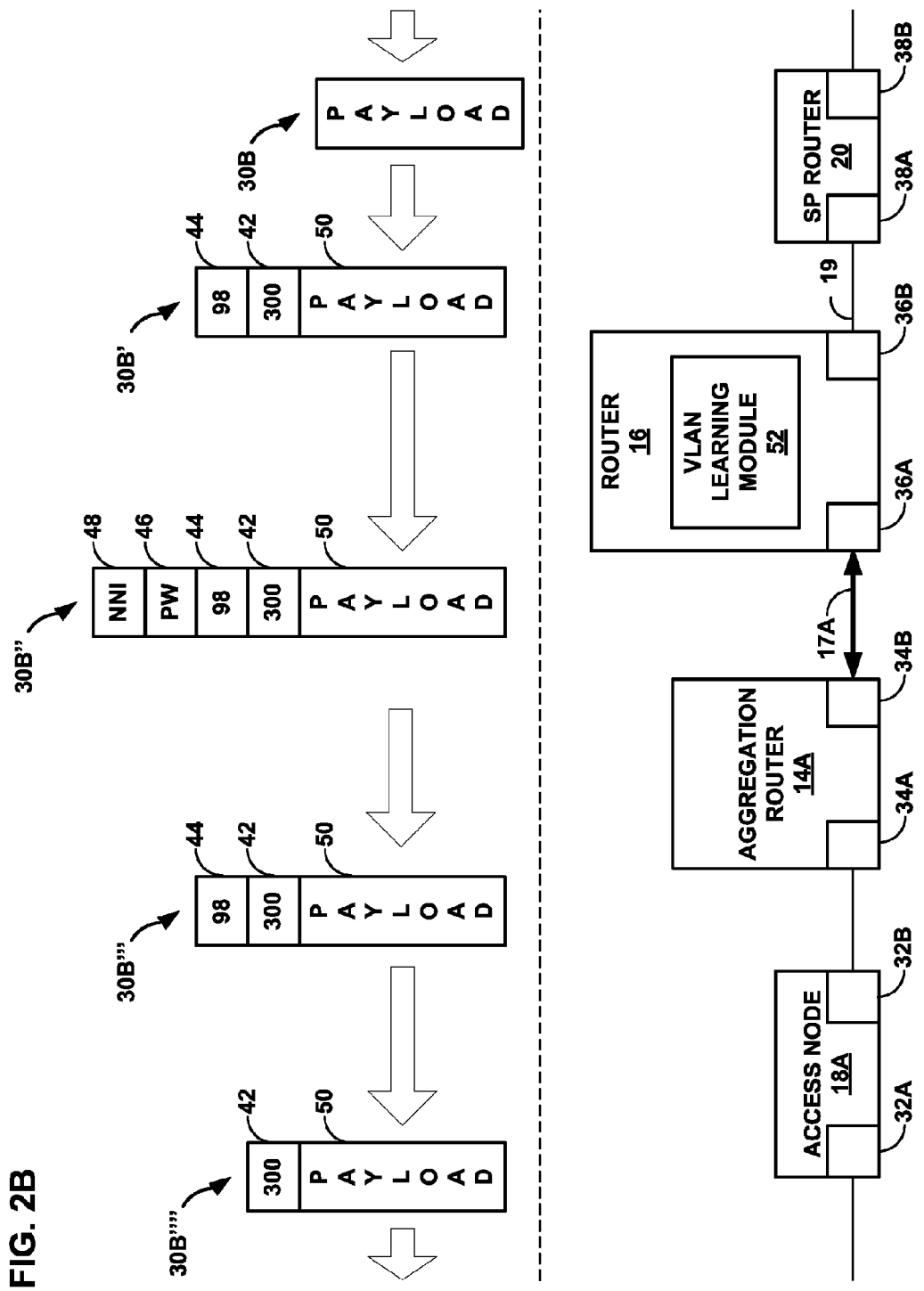

FIGS. 2A, 2B are block diagrams illustrating example operations of aggregation router 14A and network interface router 16 of FIG. 1 in more detail as these devices switch L2 packets 30A, 30B and implement various aspects of the modified L2 learning techniques described in this disclosure. FIG. 2A is a block diagram illustrating example operations of access node 18A, aggregation router 14A and network interface router 16 of FIG. 1 in more detail as these devices switch packet 30A upstream from one of CVLANs 24A identified by a CVLAN tag having a CVID of 300 to ISP network 12 and implement various aspects of the modified L2 learning techniques described in this disclosure.

In the top half of FIG. 2A, an exemplary L2 packet 30A is shown proceeding from the one of CVLANs 24A identified by a CVLAN tag having a CVID of 300 upstream to ISP network 12. Underneath packet 30A, the example of FIG. 2A shows access node 18A, aggregation router 14A, network interface router 16 and SP router 20. Access node 18A includes interfaces 32A, 32B, which may also be referred to as ports 32A, 32B. Aggregation router 14A includes interfaces 34A, 34B. Network interface router 16 includes interfaces 36A, 36B, while SP router 20 includes interfaces 38A, 38B. Interface 32A of access node 18A couples to the identified one of CVLANs 24A and receives packet 30A. As shown on the far left of the top half of FIG. 2A, packet 30A, as received by interface 32A, includes a payload 40 and a CVLAN tag 42 with a value of 300 that identifies the CVLAN. Payload 40 represents the data or other information sent to the public network via SP network 12.

Interface 32A of access node 18A parses CVLAN tag 42 and retrieves a L2 learning table associated with this CVLAN tag 42. While not shown in FIG. 2A, packet 30A also includes a source L2 MAC address and a destination L2 MAC address. Interface 32A performs learning on the source L2 MAC address and updates the L2 learning table associated with CVLAN tag 42 in the manner described above when interface 32A has not previously learned of the source L2 MAC address. Interface 32A also performs a lookup in this L2 learning table associated with CVLAN tag 42 using the destination MAC address as a key. Assuming that interface 32A has previously learned of this destination MAC address, interface 32A identifies interface 32B as associated with the destination MAC address and switches packet 30A to interface 32B. Interface 32B also performs learning in the manner described above with respect to the source L2 MAC address. Interface 32B may have been previously configured to associate packets having a CVLAN tag 42 with a value of 300 to SVLAN 26, which is identified by an SVLAN tag having an SVID of 98. Interface 32B pushes an SVLAN tag 44 with this SVID value onto packet 30A to generate packet 30A'. Interface 32B then forwards packet 30A' to interface 34A of aggregation router 14A.

Interface 34A of aggregation router 14A receives packet 30A' that includes both SVLAN tag 44 and CVLAN tag 42. Aggregation router 14A may authenticate this user based on authentication information included within packet 30A through a request to RADIUS server 28 in the manner described above. Assuming such authentication is successful or that this user has been previously authenticated and authorization to access core network 10 is granted by RADIUS server 28, such authorization includes data defining an association between SVID 98 and a service instance (e.g., a VPLS instance) of aggregation router 14A, which as noted above has been configured to be associated with ISP network 12. In this example, the authorization data associates the SVLAN tag identifying SVLAN 26A, i.e., SVID 98 in this example, with a service instance that connects aggregation router 14A to network interface router 16 using PW 17A. Once authorization is received, interface 34A performs the modified L2 learning techniques described in this disclosure.

In accordance with this modified form of L2 learning and forwarding, interface 34A retrieves the L2 learning table and determines whether this interface 34A has previously learned of this combination of SVLAN tag 44 and the identified CVLAN of CVLANs 24A. If no entry exists in the L2 learning table (meaning that interface 34A has not yet seen or learned of this SVLAN tag 44), interface 34A updates the L2 learning table to associate the value of SVLAN tag 44, i.e., SVID 98 in this example, in combination with the value of CVLAN tag 42, i.e., CVID 300 in this example, with interface 34A. If an entry exists in the L2 learning table that corresponds to the combination of SVLAN tag 44 and CVLAN tag 42 (meaning interface 34A has already learned of this CVLAN), interface 34A need not update its L2 learning table in the manner described above.

While described above as separately learning CVLAN and SVLAN tags, aggregation router 14A may learn on the combination of CLVAN/SVLAN tags. In this instance, aggregation router 14A receives packet 30A' that includes both SVLAN tag 44 and CVLAN tag 42. Aggregation router 14A parses both of CVLAN and SVLAN tags 42, 44, respectively, and stores a table indexed on CVLAN/SVLAN tag combinations. Aggregation router 14A then performs a lookup in this combined table using CVLAN/SVLAN tags 42, 44 as an index into the combined table. Thus, while described in this example as learning separately on CVLAN tags and SVLAN tags, the learning may occur based on CVLAN/SVLAN tag combinations. The techniques should not therefore be limited in this respect.

This modified form of L2 learning may avoid having to learn any source L2 MAC addresses with respect to VLANs as is common in conventional networks. By avoiding conventional L2 learning based on source L2 MAC addresses, interface 34A avoids having to maintain separate L2 learning tables for each VLAN, each of which stores separate entries for each customer associated with that VLAN. Instead, interface 34A need only maintain a single L2 learning table to learn of (SVID, CVID) pairs.

After performing this modified form of L2 learning, aggregation router 14A then switches received packet 30A' based on SVID value 98 to the interface that couples to PW 17A, which is assumed to be represented by interface 34B. In response to this packet 30A', interface 34B appends MPLS labels shown as a pseudowire (PW) label 46 ("PW 46") and network-to-network interface (NNI) label 48 ("NNI 48") to packet 30A' so as to form packet 30A". PW tag 46 identifies PW 17A while NNI tag 48 identifies an NNI used for packet relay. Not all instances of packet 30A" include NNI tag 48. As this L2 packet includes MPLS labels, packet 30A" may also be referred to as an MPLS packet 30A". Interface 34B then forwards packet 30A" via PW 17A to interface 36A of network interface router 16.

Interface 36A of network interface router 16 receives this L2 packet 30A" from aggregation router 14A via PW 17A. Network interface router 16 uses PW label 46 and/or NNI label 48 to identify a service instance of the network interface router for SP network 20. Network interface router 16 also removes PW label 46 and NNI label 48 from packet 30A" to form L2 packet 30A'''.

VLAN learning module 52 of network interface router 16 then implements the techniques described in this disclosure to learn the (SVID, CVID) pair from L2 packet 30A''' by mapping the pair to a downstream interface to aggregation router 14A (i.e., PW 17A). VLAN learning module 52 determines the SVID and CVID for SVLAN tag 44 and CVLAN tag 42, respectively, and uses these values as a key to an L2 learning table for the service instance. The L2 learning table includes entries that each map a range of CVIDs for a given SVID to a downstream interface of network router 16 and that also include a bitmap that stores a flag to indicate whether a particular CVID within the range of CVIDs for a given SVID is learned by network interface router 16 for the service instance. VLAN learning module 52 keys into the L2 learning table using the determined (SVID, CVID) pair from packet 30A''' to determine whether an entry exists having a CVID range for the SVID that encompasses the CVID. If such an entry exists, VLAN learning module 52 sets the bit for the CVID if the bit is not already set. Otherwise, VLAN learning module 52 creates a new entry for the L2 learning table, maps the entry to an interface for PW 17A, and sets the bit for the CVID to indicate the CVID is learned.

After performing this modified learning in accordance with the techniques described in this disclosure, interface 36A switches, based on SVLAN tag 44, packet 30A''' to the interface of network interface router 16 that couples to SP router 20 of ISP network 12, i.e., interface 36B in this example. Network interface router 16 may be statically provisioned by the network operator or administrator to associate the value of SVLAN tag 44 identifying SVLAN 26A to interface 36B. Interface 36B of network interface router 16 then forwards the packet 30A''' to SP router 20. Interface 36B may also learn SVLAN tag 44 by associating the SVID value of 98 with interface 36A that is a downstream interface toward the appropriate one of aggregation routers 14 serving the SVLAN with SVID value of 98.

FIG. 2B is a block diagram illustrating example operations of access node 18A, aggregation router 14A, and network interface router 16 of FIG. 1 in more detail as these devices switch packet 30A downstream from ISP network 12 to one of CPE 22 that resides within a CVLAN of CVLANs 24A identified by a CVLAN tag having CVID of 300 using various aspects of the modified L2 learning techniques described in this disclosure. Similar to FIG. 2A, the top half of FIG. 2B shows an exemplary L2 packet 30B as it proceeds from ISP network 12 to the CVLAN of CVLANs 24A that is identified by a CVLAN tag having CVID of 300. Underneath packet 30B, the example of FIG. 2B shows access node 18A, aggregation router 14A, network interface router 16 and SP router 20 in a similar level of detail as that shown in FIG. 2A.

Initially, packet 30B arrives at SP router 20 from the public network accessible by ISP network 12 having an identified destination of a CPE 22 accessible by access node 18A in a header of payload 50. SP router 20 appends the appropriate SVLAN tag that identifies SVLAN 26A, i.e., SVLAN tag 44 in this example, and CVLAN tag that identifies CVLAN 24A, CVLAN tag 42 in this example, based on this destination address to form packet 30B'. That is, interface 38B receives packet 30B having only payload 50, which refers to a fully formed L2 packet in this example including a L2 header and a L2 payload. The L2 payload may store a L3 packet having a L3 header and a L3 payload, where the L3 header specifies an IP destination address assigned to a customer device within a network served by the CPE 22 uniquely identified by SVLAN tag 44 and CVLAN tag 42. Interface 38B may perform a lookup in the L2 learning table based on the L2 destination MAC address specified in the L2 header, where this lookup identifies interface 38A as the interface that provides access to the specified L2 destination MAC address. SP router 20 then switches this packet 30B to interface 38A, which proceeds to form packet 30B' in the manner described above by appending SVLAN tag 44 and CVLAN tag 42. Interface 38A then forwards packet 30B' to network interface router 16, which receives packet 30B' via interface 36B.

Upon receiving this packet, interface 36B identifies a service instance for attachment circuit 19 and switches the packet to interface 36A. Interface 36A performs a lookup in an L2 learning table for the service instance based on SVLAN tag 44 and CVLAN tag 42. That is, interface 36A uses the (SVID, CVID) pair of (98, 300), in this example, for SVLAN tag 44 and CVLAN tag 42 as a lookup key for the L2 learning table to determine whether the (SVID, CVID) has been previously learned using the modified learning techniques performed by VLAN learning module 52. The L2 learning table for the service instance, as described above, includes entries that each map a range of CVIDs for a given SVID to a downstream interface of network router 16 and that also include a bitmap that stores a flag to indicate whether a particular CVID within the range of CVIDs for a given SVID is learned by network interface router 16. Interface 36A keys into the L2 learning table using the determined (SVID, CVID) pair from packet 30B' to determine whether an entry exists having a CVID range for the SVID that encompasses the CVID. If such an entry exists, interface 36A checks the bit for the CVID within the bitmap of the entry. If the bit is not set, interface 36A drops packet 30B' because the packet as tagged is destined for a downstream subscriber that is not presently authenticated. In this way, network interface router 16 prevents packets such as those that may be double VLAN-tagged for internal use by ISP network 20 from being "leaked" across core network 10 for delivery to CPE 22. If the bit is set, indicating the (SVID, CVID) is learned, interface router 36A switches packet 30B' to an interface mapped to the entry in the L2 learning table. In this example, the mapped interface is a pseudowire interface for PW 17A, which adds appends PW label 46 and NNI label 48 to packet 30B' to form packet 30B".

Interface 36A forwards packet 30B" to aggregation router 14A via PW 17A. Interface 34B of aggregation router 14A associated with PW 17A receives packet 30B' and removes NNI label 48 and PW label 46. Interface 34B then performs a lookup in an L2 learning table for the service instance associated with PW 17A using SVLAN tag 44 and CVLAN tag 42 as a key. Interface 34B may also learn in this downstream direction as well and install an association between SVLAN tag 44 of the received packet and interface 34B associated with PW 17A that received packet 30B". Aggregation router 14A switches packet 30B''' to the interface determined via the lookup, i.e., interface 34A in this example. Assuming such an interface was identified via the lookup, aggregation router 14A switches the packet to interface 34A, which proceeds to forward this packet 30B' to access node 18. Interface 32B of access node 18A receives this packet, removes SVLAN tag 44 and performs a lookup in the lookup table based on CVLAN tag 42. Assuming this lookup identifies interface 32A, access node 18 switches this packet 30B''' to interface 32A, which forwards this packet over the CVLAN of CVLANs 24A specified by CVLAN tag 42 (i.e., with CVID of 300).

Figure 3:
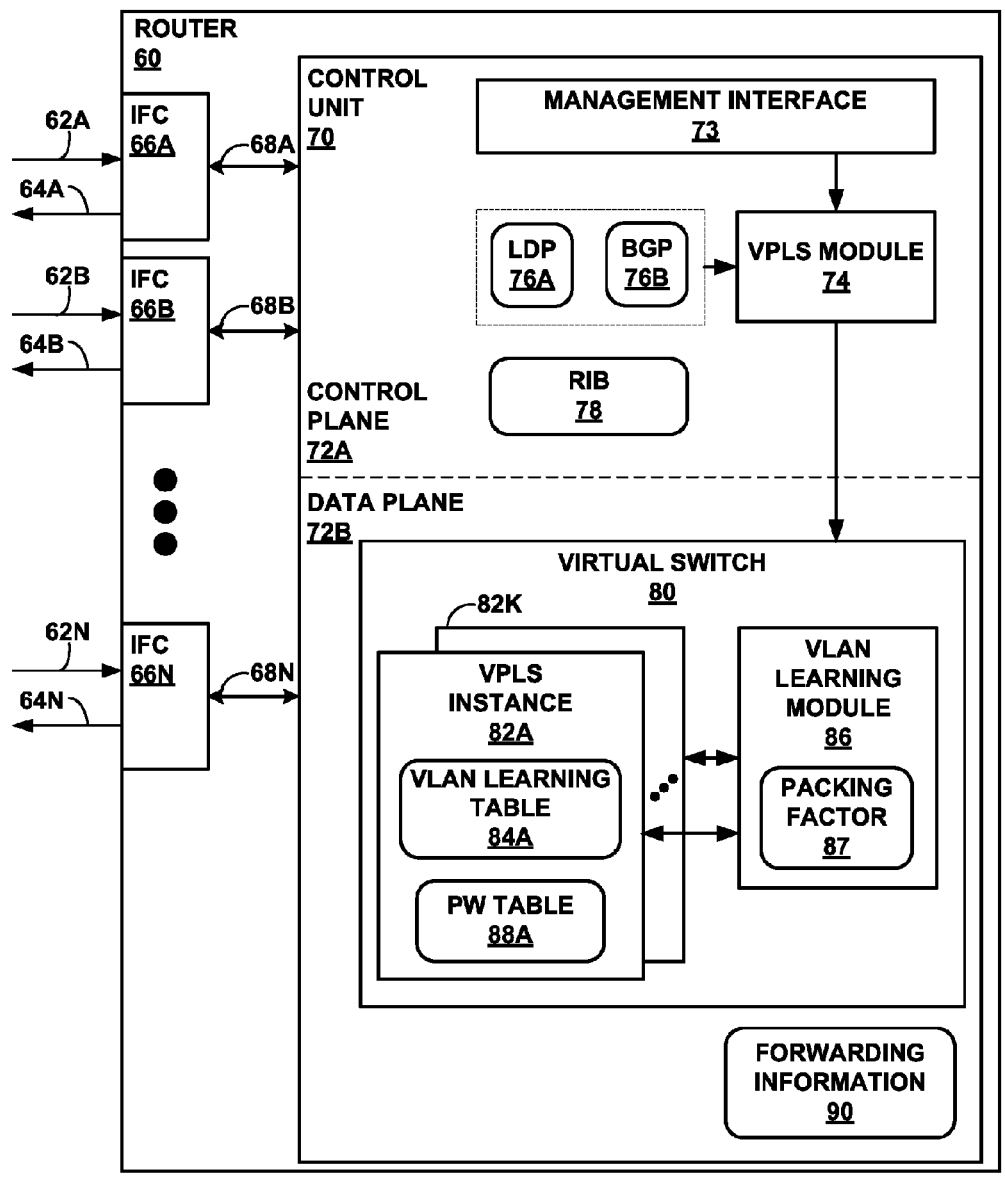
FIG. 3 is a block diagram illustrating example router that performs modified VLAN-based learning techniques described in this disclosure.

FIG. 3 is a block diagram illustrating example router 60 that performs modified L2 VLAN-based learning techniques described in this disclosure. Reference to a VPLS instance hereinafter may refer to a VPLS instance that is a hierarchical-VPLS (H-VPLS) instance. For purposes of illustration, router 60 may be described below within the context of an exemplary network system 8 of FIG. 1 and may represent network interface router 16 or any of aggregation routers 14. Whereas downstream interfaces for network interface 16 are service links (e.g., pseudowires, tunnels, label-switched paths, or IP paths), downstream interfaces of aggregation routers 14 are SVLAN interfaces. Moreover, while described with respect to a particular network device, e.g., a router, the techniques may be implemented by any network device that may provide a L2 service. For example, router 60 may also represent and perform the functionality of a multi-tenant unit (MTU). The techniques should therefore not be limited to the exemplary embodiments described in this disclosure.

Router 60 includes a control unit 70 and interface cards 66A–66N ("IFCs 66") coupled to control unit 70 via internal links 68A–68N. Control unit 70 may comprise one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 70 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 70 is divided into two logical or physical "planes" to include a first control or routing plane 72A ("control plane 72A") and a second data or forwarding plane 72B ("data plane 72B"). That is, control unit 70 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 72A of control unit 70 executes the routing functionality of router 60. In this respect, control plane 72A represents hardware or a combination of hardware and software of control unit 30 that implements routing protocols (not shown in FIG. 2) by which routing information stored in routing information base 78 ("RIB 78") may be determined. RIB 78 may include information defining a topology of a network, such as core network 10 of FIG. 1. Control plane 72A may resolve the topology defined by routing information in RIB 68 to select or determine one or more routes through the network. Control plane 72A may then update data plane 72B with these routes, where data plane 72B maintains these routes as forwarding information 90. Forwarding or data plane 72B represents hardware or a combination of hardware and software of control unit 70 that forwards network traffic in accordance with forwarding information 90.

Control plane 72A further includes management interface 73 by which a network management system or in some instances an administrator using a command line or graphical user interface, configures in VPLS module 74 one or more VPLS instances for a network to interconnect combinations of Ethernet networks (e.g., networks of L2 network 9 and ISP network 12 of FIG. 1) into a single Ethernet domain using pseudowires across core network 10. For example, an administrator may configure router 60 as a participant in a particular VPLS instance, such as the service instance that connects L2 networks served by aggregation routers 14 to SP router 20 via respective PWs 17 with network interface router 16, as illustrated in FIG. 1. VPLS module 74 may perform auto-discovery or other techniques to determine additional routers or MTUs participating in a VPLS instance and additionally performing signaling techniques to establish pseudowires between router 60 and each of the additional routers, e.g., aggregation routers 14. In the case of an H-VPLS instance, VPLS module 74 may perform signaling to establish one or more spokes and/or one or more hub links with one or more other MTUs and/or routers. Furthermore, while described as establishing and operating a VPLS, VPLS module 74 in various instances may establish and manage any type of L2VPN to provide a L2 emulation service (i.e., a service instance) that offers L2 interconnectivity to L2 networks.

VPLS module 74 may execute Label Distribution Protocol (LDP) 76A- and/or Border Gateway Protocol (BGP) 76B-based techniques to perform auto-discovery and signaling. Additional details regarding establishing a VPLS using BGP are found in "Virtual Private LAN Service (VPLS) Using Border Gateway Protocol (BGP) for Auto-Discovery and Signaling," Request for Comments: 4761, Network Working Group (Kompella and Rekhter, ed.), January 2007, which is incorporated by reference as if fully set forth herein. Additional details regarding establishing a VPLS using LDP are found in "Virtual Private LAN Service (VPLS) Using Label Distribution Protocol (LDP) Signaling," Request for Comments: 4762, Network Working Group (Lasserre and Kompella, ed.), January 2007, which is incorporated by reference as if fully set forth herein.

Data plane 72B includes one or more forwarding units, such as packet forwarding engines ("PFEs"), that provides high-speed forwarding of network traffic received by interface cards 66 via inbound links 62A-62N to outbound links 64A-64N. In some embodiments, aspects of data plane 72B are distributed to a number of distributed forwarding units, such as the above-mentioned packet forwarding engines, each associated with a different one or more IFCs 66.

Virtual switch 80 of data plane 72B represents hardware or a combination of hardware and software to implement virtual switching and other VPLS-related functionality for VPLS instances 82A-82K ("VPLS instances 82") in which router 60 participates. Virtual switch 80 implements each of VPLS instances 82 to operate as a virtual switching instance or virtual bridging instance to interconnect multiple L2 networks over core network 10. Each of VPLS instances may be associated with a different ISP network. For purposes of explanation, VPLS instance 82A in this example switches PDUs destined for/received from ISP network 12. While described hereinafter with respect to VPLS instance 82A, each of VPLS instances 82 includes similarly components that perform similar functionality.

VPLS instance 82A includes pseudowire table 88A ("PW table 88A") that stores pseudowire identifiers configured by VPLS module 74 for the VPLS instance as well as VLAN learning table 84A that maps learned customer VLANs to interface identifiers, such as pseudowire identifiers for service links included in PW table 88A for VPLS instance 82A. PW table 88A may store data defining an association between pseudowire labels of two unidirectional pseudowires that together constitute a bidirectional link between two network devices.

VLAN learning module 86 of virtual switch 80 performs customer VLAN-based learning using techniques described in this disclosure for each of VPLS instances 82. That is, VLAN learning module 86 "learns" customer VLANs from inbound service links (e.g., pseudowires) for a VPLS instance and associates those customer VLANs with corresponding outbound service links (e.g., pseudowires) for the instance. VLAN learning module 86 may identify outbound service links corresponding to inbound service links using respective PW tables 88 for the instances that associate inbound and outbound aspects of a bidirectional service link. As noted above, VPLS instance 82A includes VLAN learning table 84A that maps learned customer VLANs to service links (e.g., PWs 17) over core network 10 for the VPLS instance. VLAN learning table 84A is an associative data structure and may be stored within content-addressable memory (CAM), ternary CAM (TCAM), or another computer-readable medium. While described herein as implementing a VPLS instance, VPLS instance 82A may implement any L2VPN service instance that offers a L2 emulation service to L2 networks and use the described techniques to learn outbound interfaces for customer VLANs.

VLAN learning module 86 includes packing factor 87, a scalar value configured by a network operator or other entity via management interface 73 that defines the length of CVID ranges for VLAN learning tables 84 entries. Packing factor 87 typically corresponds to respective CVID ranges allocated by the network operator to access nodes 18 for a particular SVID. For example, where network operator allocates CVIDs in blocks of 64, network operator typically sets packing factor 87 with a scalar value 64. In some embodiments of router 60, packet factor 87 may be set within firmware of data plane 72B or control plane 72A and not configurable via a management interface.

VLAN learning table 84A entries each map a range of CVIDs, with length equal to packing factor 87, for an SVID to an outbound service link. When virtual switch 80 receives an L2 PDU via a service link of PW table 88A for VPLS instance 82A, VLAN learning module 86 first identifies the (SVID, CVID) pair for the SVLAN tag and CVLAN tag of the PDU, then determines based on packing factor 87 whether VLAN learning table 84A includes an entry having, for the SVID of the PDU, a CVID range that encompasses the CVID of the PDU. The division of CVID ranges within the CVID space is dependent upon packing factor 87. For example, where packing factor 87 has value 64 and the CVID space is $2^{12}$ or 4096, the CVID space is divided into 64 different CVID ranges each having length 64. Where packing factor 87 has value 32 and the CVID space is 4096, the CVID space is divided into 128 different CVID ranges each having length 32. For a given CVID of a PDU, VLAN learning module 86 identifies the potential CVID range that encompasses the CVID by computing the CVID range base value using packing factor 87. One example of such a computation is described in further detail below with respect to FIG. 4.

To continue the above example, where VLAN learning module 86 determines based on packing factor 87 that VLAN learning table 84A includes an entry for the (SVID, CVID) pair of the received PDU, VLAN learning module 86 further determines whether a corresponding bit is set for the CVID within a bitmap of length pacing factor 87. If VLAN learning table 84A either does not include an entry for the (SVID, CVID) pair or the corresponding bit is not set, VLAN learning module 86 creates such an entry (if necessary), sets the corresponding bit for the CVID, and maps the entry to the outbound service link identified in PW table 88A associated with the inbound service link on which the PDU was received. In this way, VLAN learning module 86 learns outbound interfaces for customer VLANs for VPLS instance 82A. Virtual switch 80 may then switch the PDU to one or more attachment circuits for VPLS instance 82A, e.g., attachment circuit 19 to SP router 20 of FIG. 1.

When virtual switch 80 receives an L2 PDU from an ISP network, such as via an attachment circuit associated by VPLS module 74 with VPLS instance 82A, the virtual switch determines whether the (SVID, CVID) pair for the PDU is learned within VLAN learning table 84A based on packing factor 87. That is, virtual switch 80 determines whether an entry exists for the CVID range, for the SVID, for the CVID of the PDU and whether the corresponding bit is set within the bitmap of the entry. If such an entry exists and the corresponding bit is set, virtual switch 80 switches the PDU to an outbound service link mapped to the entry. If the (SVID, CVID) pair is not learned within VLAN learning table 84A, virtual switch 80 may drop the PDU to avoid unnecessarily forwarding the PDU over the core network.

By packing multiple learned CVIDs into each entry of VLAN learning table 84A in the manner described above, virtual switch 80 may significantly reduce the amount of storage needed to maintain an association between learned CVLANs and outbound interfaces mapped thereto, where the scalability increase in CVLANs learned correlates to the size of packing factor 87. As a result, router 60 may potentially handle switching for many more CVLANs of a large-scale L2 network that connects via router 60 to ISP networks than would be possible using conventional techniques.

Figure 4:
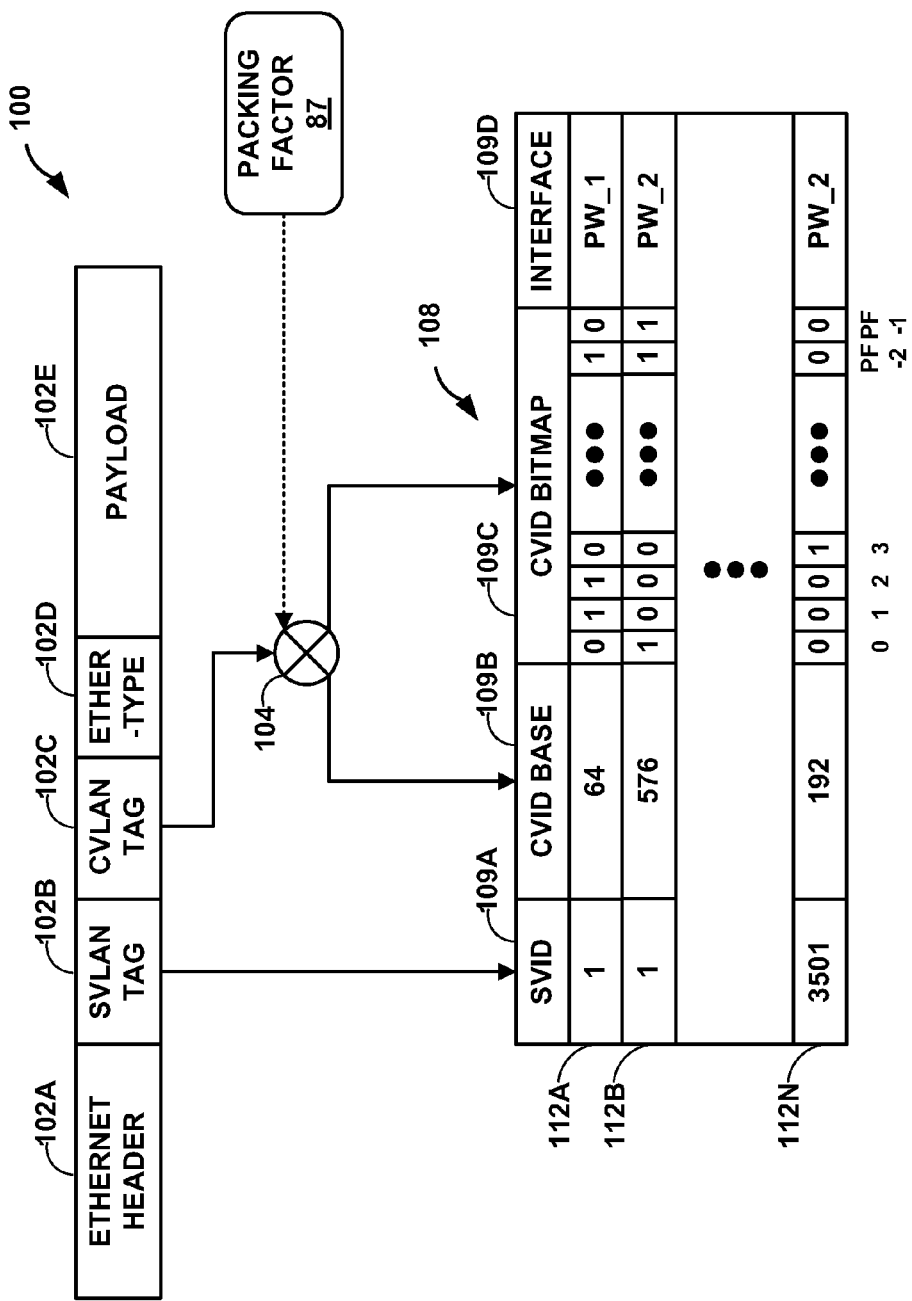
FIG. 4 is a block diagram illustrating an Ethernet MAC frame and an example VLAN learning table that maps outbound service links to multiple (SVID, CVID) pairs using the described techniques.

FIG. 4 is a block diagram illustrating Ethernet MAC frame 100 and an example VLAN learning table 108 that maps outbound service links to (SVID, CVID) pairs by packing multiple CVIDs into VLAN learning table entries 112A-112N ("table entries 112") using the described techniques. VLAN learning table 108 may represent an example embodiment of any of VLAN learning tables 84 of FIG. 3. While illustrated as a table, VLAN learning table 108 may be any associative data structure that facilitates a mapping of interfaces to values for SVID, CVID base, and CVID range combinations.

Ethernet MAC frame 100 includes header fields 102A-102D and payload 102E. Payload 102E may be an L3 packet, such as an IP packet. Ethernet header 102A includes the source and destination MAC addresses for Ethernet MAC frame 100. EtherType 102D specifies the protocol that Ethernet MAC frame 100 encapsulates payload 102E. EtherType 102D may in some instances have value 9100 specifying the Q-in-Q protocol to indicate Ethernet MAC frame 100 includes multiple VLAN tags. However, multiple VLAN tags may be present in Ethernet MAC frame 100 for different values of EtherType 102D. SVLAN tag 102B in combination with CVLAN tag 102C uniquely identifies a customer of an ISP network to a large-scale L2 network. SVLAN tag 102B includes a 12-bit service VLAN identifier (SVID) and CVLAN tag 102C includes a 12-bit service VLAN identifier (CVID) that in combination provide for identifying up to $2^{24}$ or 16M different customers.

VLAN learning table entries 112 include respective values for fields 109A-109D. SVID field 109A specifies an SVID key value. CVID base field 109B specifies the lower bound of a CVID range within the CVID space for the SVID specified by SVID field 109A, where the CVID range has a length equal to packing factor 87. For example, CVID-base field 109B of VLAN learning table entry 112A specifies value 0 as a lower bound for a CVID range for SVID 1. Where packing factor 87 has value 64, for example, the CVID range for table entry 112A is therefore [0, 63]. Similarly, CVID-base field 109B of table entry 112N specifies value 192 for a CVID range for SVID 3501. Where packing factor 87 has value 64, for example, the CVID range for table entry 112N is [192, 255].

CVID bitmap field 109C includes a number of bit variables equal to packing factor 87. These bit variables form a bitmap having a length equal to packing factor 87 and bit variables that may each be referenced according to their position within the bitmap. In the illustrated example, each CVID bitmap is lower-bounded by position 0 and upper-bounded by position PF-1 equal to the value of one less than packing factor 87. To continue the example, a set bit (i.e., value=1) indicates the CVID corresponding to the bit is learned, while a clear bit (i.e., value=0) indicates the CVID corresponding to the bit is unlearned. Position 0 of each CVID bitmap for a particular one of table entries 112 corresponds to the CVID specified by the CVID base field 109B of the table entry. Position PF-1 of each CVID bitmap for a particular one of table entries 112 accordingly corresponds to the CVID specified by the CVID base field 109B of the table entry plus the value for PF-1. For example, table entry 112N specifies a CVID base field value of 192, which is a lower bound for the CVID range for the table entry. As noted above, the CVID range for table entry 112N is [192, 255] where packing factor 87 is 64. Position 0 of CVID bitmap field 109C for table entry 112N thus corresponds to CVID 192, position 1 corresponds to CVID 193, and so on through position PF-1 corresponding to CVID 255. Because each of these CVIDs values corresponding to bit positions of CVID bitmap field 109C for one of table entries 112 is for a particular SVID value specified by SVID field 109A of the table entry, the combination of the SVID value and CVID value forms a (SVID, CVID) pair that uniquely identifies a customer. The bit value for a (SVID, CVID) pair thus specifies whether the customer is learned.

Each of table entries 112 also includes interface field 109D that specifies an outbound interface of a service link (e.g., a pseudowire) mapped by VLAN learning module 86 to the CVID range indicated by CVID base field 109B and CVID bitmap field 109C for the SVID indicated by SVID field 109A. For example, table entry 112A maps the CVID range [0, 63] of SVID 1 to interface "PW_1" that identifies a pseudowire for the service instance. Each of the (SVID, CVID) pairs for the CVID range maps to the same interface. In this way, VLAN learning table 108 may pack multiple CVIDs for an SVID into a single entry, with the marginal storage space required for each CVID being only one bit provided that each CVID for the SVID corresponds to a customer of the same service instance.

During VLAN learning table 108 lookup on L2 PDUs that conform to Ethernet MAC frame 100, the lookup entity (e.g., virtual switch 80 or VLAN learning module 86), uses the VLAN identifiers for SVLAN tag 102B and CVLAN tag 102C to key to table entries 112. The SVID of SVLAN tag 102B keys directly to SVID field 109A of table entries 112. To determine the CVLAN base value and CVLAN bitmap position for the CVID of CVLAN tag 102C, the lookup entity performs operations 104. In this example, operations 104 includes an integer division of the CVID by packing factor 87 to generate an integer quotient and integer remainder (i.e., the modulus). Operations 104 further includes multiplying the integer quotient by packing factor 87 to generate the CVID base value. The CVID base value keys to CVID base field 109B, while the integer remainder identifies a CVID bitmap field 109C position. For example, given (SVID, CVID) pair (1, 66) and packing factor 87 having value 64, the lookup entity performs operations 104 to generate integer quotient 66/64=1 with remainder 2. The lookup entity further computes CVID base of 64 as determined by the quotient of operations 104 multiplied by packing factor 97 (i.e., the product of the quotient and packing factor 97), and the integer remainder is 2 as determined by the modulus of operations 104. Because the SVID of the example (SVID, CVID) pair is 1, this pair keys to table entry 112A. Position 2 of CVID bitmap field 109C for table entry 112A has a set bit indicating (SVID, CVID) pair (1, 66) is learned.

Figure 5:
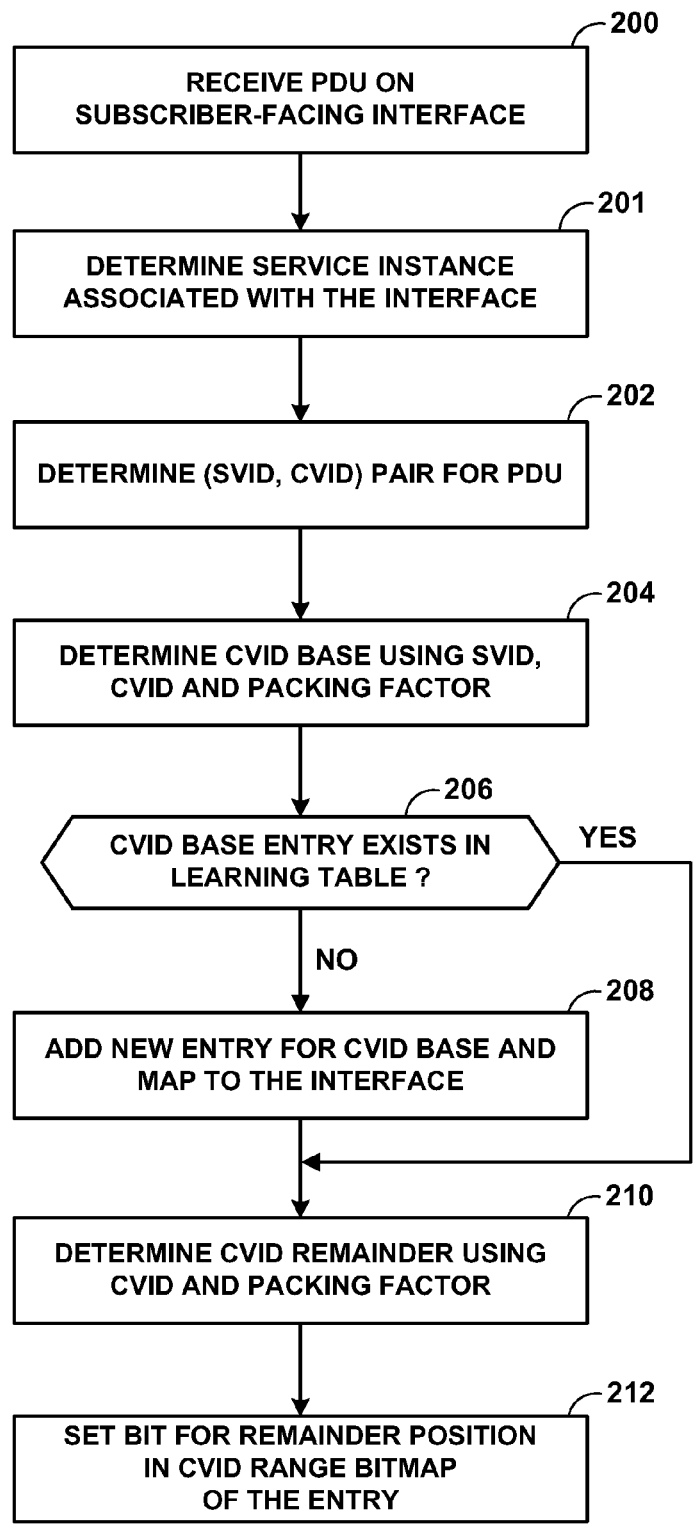
FIG. 5 is a flow chart illustrating an example mode of operation of a router to learn downstream interfaces for (SVID, CVID) pairs that each uniquely identify customers devices using modified VLAN learning techniques described herein.

FIG. 5 is a flow chart illustrating an example mode of operation of router 60 to learn downstream interfaces for (SVID, CVID) pairs that each uniquely identify customers devices using modified VLAN learning techniques described herein. Upon receiving an L2 PDU on a service interface of one of inbound interfaces 62 (200), virtual switch 80 determines a corresponding one of VPLS instances 82 associated with the service interface (201). While described with respect to a VPLS service instance, the L2 service may be any form of L2VPN. VLAN learning module 86 determines the (SVID, CVID) pair for the PDU based on the SVLAN and CVLAN tags attached to the PDU (202).

VLAN learning module 86 uses packing factor 87 to determine a CVID base to use as a key into the VLAN learning table 82 for the determined VPLS instance (204). For example, VLAN learning module 86 may compute an integer quotient of the CVID of the PDU and the packing factor 87 value, then multiply the integer quotient by the packing factor 87 value. VLAN learning module 86 uses the SVID and CVID base to key into the VLAN learning table to determine a table entry for the key (206). If a table entry for the SVID, CVID base is not found (NO branch of 206), VLAN learning module 86 creates a new table entry for the SVID, CVID base and maps the new table entry to the service interface on which the PDU was received (208). After determining that a table entry for the SVID, CVID base exists (YES branch of 206) or creating a new such entry, VLAN learning module 86 determines a position within a CVID bitmap for the determined (or new) table entry based on the CVID and the packing factor 87 value (210). In this example, the position is the value of the CVID modulo packing factor 87. To mark the (SVID, CVID) of the PDU as learned, VLAN learning module 86 sets the bit for the determined position within the CVID bitmap for the table entry (212). Router 60 performing this example mode of operation may represent a network interface router have downstream interfaces that are service links (e.g., pseudowires). Router 60 may also represent an aggregation router, such as one of aggregation router 14, having downstream interfaces that are SVLAN interfaces.

Figure 6:
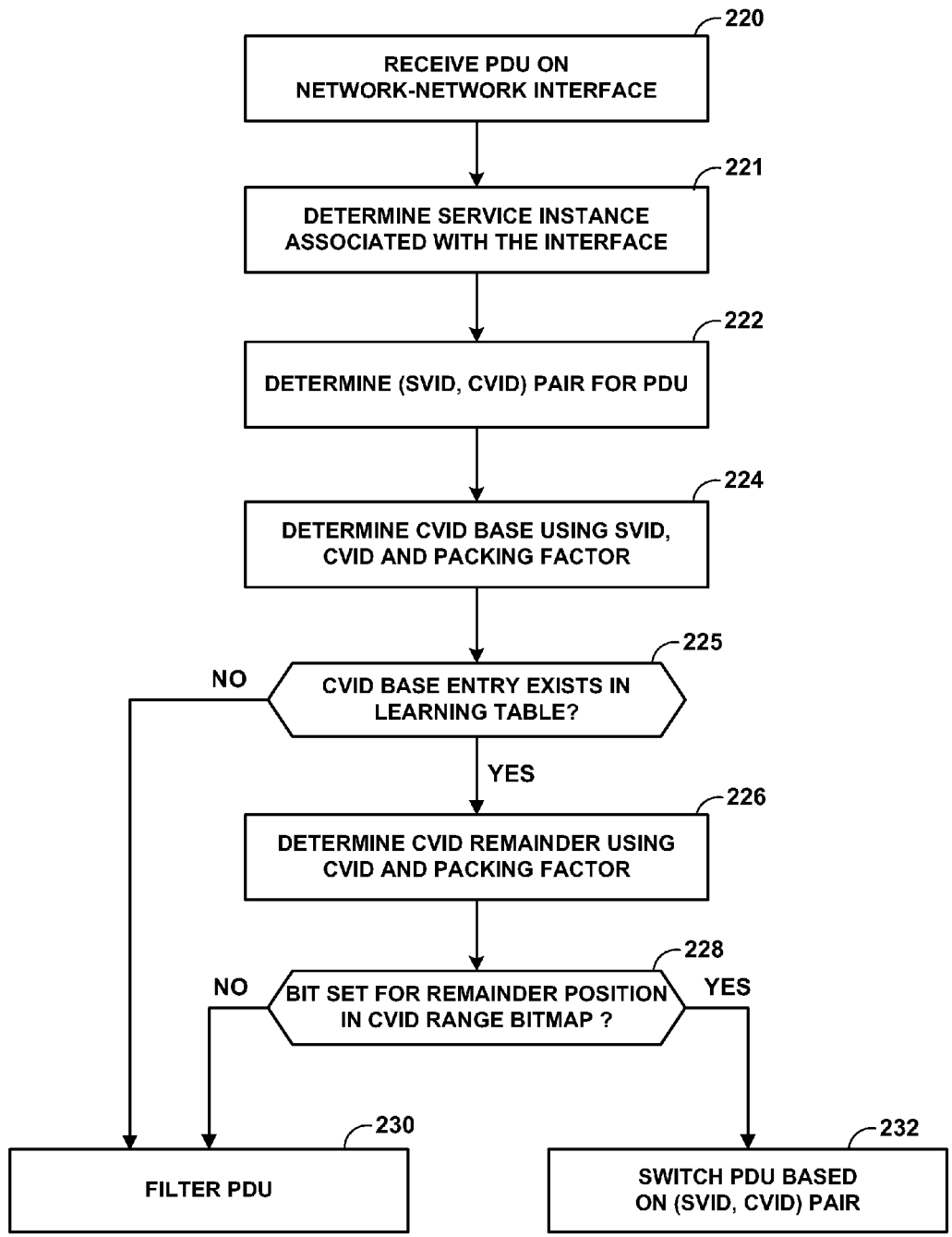
FIG. 6 is a flow chart illustrating an example mode of operation of a router to switch a received PDU toward a downstream customer device using a VLAN learning table that packs multiple CVIDs into respective table entries according to techniques described in this disclosure.

FIG. 6 is a flow chart illustrating an example mode of operation of router 60 to switch a received PDU toward a downstream customer device using a VLAN learning table that packs multiple CVIDs into respective table entries according to techniques described in this disclosure. Router 60 receives an L2 PDU on a network-network interface (NNI) that may couple a large-scale L2 network to an ISP network (220). The NNI includes an attachment circuit associated with one of VPLS instances 82 of router 60 for the ISP network, which router 60 determines based on the NNI (221). While described with respect to a VPLS service instance, the L2 service may be any form of L2VPN.

Virtual switch 80 the (SVID, CVID) pair for the PDU based on the SVLAN and CVLAN tags attached to the PDU (222). Virtual switch 80 uses packing factor 87 to determine a CVID base to use as a key into the VLAN learning table 82 for the determined VPLS instance (224). If a table entry for the SVID, CVID base is not found (NO branch of 225), virtual switch 80 filters (e.g., drops) the PDU (230). If the table entry is found (YES branch of 225), virtual switch 80 determines a CVID remainder to identify a position within a CVID bitmap for the table entry based on the CVID and the packing factor 87 value (226). Virtual switch 80 queries the bit at the position (228). If the bit is cleared (NO branch of 228), the (SVID, CVID) pair for the PDU is not learned and virtual switch 80 filters the PDU to prevent leakage across the core network (230). If the bit is set (YES branch of 228), the (SVID, CVID) pair for the PDU is learned, and virtual switch 80 switches the PDU to the service interface mapped to the table entry (232).

Various embodiments of the invention have been described. These and other embodiments are within the scope of the following claims.

The invention claimed is:

1. A method comprising:
storing data defining a layer two (L2) learning table with a network switch positioned between one or more aggregation network devices and a service provider network device, wherein the L2 learning table includes a plurality of entries, each of the entries including a service identifier identifying a service virtual local area network (SVLAN) and also including a bitmap having bits representing a range of customer identifiers identifying respective customer virtual local area networks (CVLANs) associated with the SVLAN, wherein each of the bits of the bitmap indicates whether a corresponding CVLAN and SVLAN has been learned and authenticated, and wherein each of the entries of the L2 learning table is associated with a core-facing interface of one of the one or more aggregation network devices;

receiving, by a receiving core-facing interface of one of the aggregation network devices, a first PDU that includes a service identifier identifying an SVLAN of the first PDU and a customer identifier identifying a CVLAN of the first PDU;

accessing the L2 learning table to determine whether any one of the entries of the L2 learning table includes the service identifier and also includes a bitmap having bit representing a range of customer identifiers that include the customer identifier of the first PDU; and based on the determination that none of the entries of the L2 learning table includes the service identifier and also includes a bitmap having bits representing a range of customer identifiers that include the customer identifier of the first PDU, updating the L2 learning table to create a new entry in the L2 learning table that includes the service identifier of the first PDU and also includes a bitmap having bits representing a range of customer identifiers that include the customer identifier of the first PDU, wherein the new entry defines an association with the receiving core-facing interface without storing an association between an L2 address included within the first PDU and the receiving core-facing interface;

receiving a second packet data unit (PDU) from the service provider network device, wherein the second PDU includes both a service identifier identifying an SVLAN of the second PDU and a customer identifier identifying a CVLAN of the second PDU;

switching the second PDU when a corresponding bit of the L2 learning table for the SVLAN and CVLAN of the second PDU indicates the CVLAN and SVLAN of the second PDU has been learned and authenticated; and filtering the second PDU when the corresponding bit of the L2 learning table for the SVLAN and CVLAN of the second PDU indicates the CVLAN and SVLAN of the second PDU has not been learned and authenticated.

2. The method of claim 1, wherein the range of customer identifiers associated with the new entry is a contiguous range of customer identifiers.

3. The method of claim 2, wherein the combination of the service identifier of the first PDU and the range of customer identifiers associated with the new entry identify an access node that resides in an aggregation network.

4. The method of claim 2,
wherein the new entry includes a service identifier that matches the service identifier of the first PDU,
wherein the new entry includes a base value for the range of customer identifiers associated with the new entry,
wherein the new entry includes a new bitmap having a length equal to a number of customer identifiers in the range of customer identifiers associated with the new entry,
wherein each bit of the new bitmap corresponds to one of customer identifiers in the range of customer identifiers associated with the new entry, the method further comprising:
identifying a bit of the new bitmap for the customer identifier of the first PDU; and
modifying the bit of the new bitmap to indicate the CVLAN and SVLAN of the first PDU is learned within the L2 learning table.

5. The method of claim 4, further comprising:
computing an integer quotient of the customer identifier of the first PDU and the length of the new bitmap; and
setting the base value of the new entry to a product of the integer quotient and the length of the new bitmap.

6. The method of claim 4, wherein identifying the bit of the new bitmap comprises:
computing an integer remainder of the customer identifier of the first PDU and the length of the bitmap, wherein the integer remainder specifies a position of the bit of the new bitmap for the customer identifier of the second PDU.

7. The method of claim 4, further comprising:
computing an integer quotient of the customer identifier of the first PDU and the length of the new bitmap;
determining the new entry in the L2 learning table for the first PDU by matching the service identifier of the first PDU to the service identifier included in the new entry and by matching a product of the integer quotient and the length of the new bitmap to the base value included in the new entry;
identifying a bit of the new bitmap for the customer identifier of the first PDU by computing an integer remainder of the customer identifier of the first PDU and the length of the new bitmap;
filtering the second PDU upon determining the identified bit of the bitmap for the customer identifier of the second PDU indicates the customer identifier of the first PDU has not been learned and authenticated; and
switching the second PDU to the one of the interfaces of the network device associated with the new entry upon determining the identified bit of the new bitmap for the customer identifier of the second PDU indicates the customer identifier of the second PDU is learned and authenticated.

8. The method of claim 4, further comprising:
receiving a third PDU with one of the interfaces of the network device, wherein the third PDU includes both a service identifier identifying a SVLAN and a customer identifier identifying a CVLAN, wherein the service identifier of the first PDU is the service identifier of the third PDU;
computing an integer quotient of the customer identifier of the third PDU and the length of the new bitmap;
determining the new entry in the L2 learning table for the third PDU by matching the service identifier of the third PDU to the service identifier included in the new entry and by matching a product of the integer quotient and the length of the new bitmap to the base value included in the new entry;
identifying a bit of the new bitmap for the customer identifier of the third PDU by computing an integer remainder of the customer identifier of the third PDU and the length of the new bitmap; and
modifying the bit of the new bitmap for the customer identifier of the third PDU to indicate both the service identifier and customer identifier of the third PDU is learned within the L2 learning table.

9. The method of claim 1, further comprising:
receiving the first PDU from an aggregation network device of the one or more aggregation network devices, wherein the network switch and the aggregation network device are configured to communicate with one another via a service link associated with the core-facing interface with the aggregation network device, and wherein the service link is associated with a service instance also associated with the service provider network device.

10. The method of claim 9,
wherein the service link comprises a pseudowire, and
wherein the service instance is a virtual private local area network (LAN) service (VPLS) instance.

11. A method comprising:
storing data defining a layer two (L2) learning table with a network switch positioned between one or more aggregation network devices and a service provider network device, wherein the L2 learning table includes a plurality of entries, wherein each of the entries includes a service identifier identifying a service virtual local area network (SVLAN) and also includes a bitmap having bits representing a range of customer identifiers identifying respective customer virtual local area networks (CVLANs) associated with the SVLAN, and wherein each of the entries of the L2 learning table specifies a core-facing interface of one of the aggregation network devices;
receiving a PDU with a receiving core-facing interface of one of the aggregation network devices, wherein the PDU includes a service identifier identifying an SVLAN of the PDU and a customer identifier identifying a CVLAN of the PDU;
accessing the L2 learning table to determine whether any one of the entries of the L2 learning table is associated with both the SVLAN and CVLAN of the PDU; and
based on the determination that none of the entries of the L2 learning table are associated with both the SVLAN and CVLAN of the PDU, updating the L2 learning table to create a new entry in the L2 learning table that is associated with both the SVLAN of the PDU and a plurality of CVLANs that includes the CVLAN of the PDU, wherein the new entry specifies the receiving core-facing interface without storing an association between a L2 address included within the PDU and the receiving core-facing interface.

12. The method of claim 11, wherein the PDU comprises a first PDU, the method further comprising:
receiving, by the network switch from the service provider network device, a second PDU that includes a service identifier identifying an SVLAN of the second PDU and a customer identifier identifying a CVLAN of the second PDU;
accessing the L2 learning table using both the service identifier and the customer identifier of the second PDU to determine whether any one of the entries of the L2 learning table is a located entry associated with both the SVLAN and CVLAN of the second PDU; and
upon determining that one of the entries of the L2 learning table is a located entry, forwarding the second PDU to one of the interfaces of the network switch that is associated with the located entry;
upon determining that none of the entries of the L2 learning table is a located entry, filtering the second PDU.

13. A network switch comprising:
a control unit having one or more processors;
a network interface coupling the network switch to a service provider network device;
a core-facing interface coupling the network switch with an aggregation network device; and
a layer two (L2) learning table of the control unit associated with the core-facing interface,
wherein the L2 learning table includes a plurality of entries, each of the entries including a service identifier identifying a service virtual local area network (SVLAN) within the service provider core network and a bitmap having bits representing a range of customer identifiers identifying respective customer virtual local area networks (CVLANs) associated with the SVLAN, wherein each of the bits indicates whether the CVLAN and SVLAN has been learned and authenticated,
wherein the core-facing interface receives a first packet data unit (PDU) from the aggregation network device, wherein the first PDU includes both a service identifier identifying a service virtual local area network (SVLAN) of the first PDU and a customer identifier identifying a customer virtual local area network (CVLAN) of the first PDU;
a virtual switch of the control unit that accesses the L2 learning table to determine whether any one of the entries of the L2 learning table includes the service identifier and also includes a bitmap having bits representing a range of customer identifiers that include the customer identifier of the first PDU; and
a VLAN learning module of the virtual switch that, based on the determination that none of the entries of the L2 learning table includes the service identifier and also includes a bitmap having bits representing a range of customer identifiers that include the customer identifier of the first PDU, updates the L2 learning table to create a new entry in the L2 learning table that includes the service identifier of the first PDU and also includes a bitmap having bits representing a range of customer identifiers that include the customer identifier of the first PDU, wherein the new entry defines an association with the core-facing interface without storing an association between a L2 address included within the first PDU and the core-facing interface.

14. The network switch of claim 13,
wherein the network interface receives a second PDU, wherein the second PDU includes both a service identifier identifying a service virtual local area network (SVLAN) of the second PDU and a customer identifier identifying a customer virtual local area network (CVLAN) of the second PDU,
wherein the virtual switch accesses the L2 learning table using both the service identifier and the customer identifier of the second PDU to determine whether any one of the entries of the L2 learning table is associated with both the service identifier and the customer identifier of the second PDU,
wherein the virtual switch filters the second PDU upon determining none of the entries of the L2 learning table is associated with both the service identifier and the customer identifier of the second PDU, and
wherein, upon determining that one of the entries of the L2 learning table is associated with both the service identifier and the customer identifier of the second PDU, the virtual switch retrieves the determined one of the entries and switches the second PDU to the core-facing interface associated with the one of the entries of the L2 learning table associated with both the service identifier and the customer identifier of the second PDU.

15. The network switch of claim 13, further comprising:
a management interface of the control unit that receives configuration data and configures a service instance in accordance with the configuration data; and
a service module that establishes one or more service links for the service instance,
wherein the core-facing interface comprises an interface with one of the service links.

16. The network switch of claim 15,
wherein the one or more service links each comprise a pseudowire, and
wherein the service instance is a virtual private local area network (LAN) service (VPLS) instance.

17. The network switch of claim 13, wherein the range of customer identifiers associated with the new entry is a contiguous range of customer identifiers.

18. The network switch of claim 13,
wherein the new entry includes a service identifier that matches the service identifier of the first PDU,
wherein the new entry includes a base value for the range of customer identifiers associated with the new entry,
wherein the new entry includes a new bitmap having a length equal to a number of the customer identifiers in the range of customer identifiers associated with the new entry,
wherein each bit of the new bitmap corresponds to one of the range of customer identifiers, and
wherein the VLAN learning module identifies a bit of the new bitmap for the customer identifier of the first PDU and modifies the bit of the new bitmap to indicate the CVLAN and SVLAN of the first PDU is learned within the L2 learning table.

19. The network switch of claim 18,
wherein the VLAN learning module computes an integer quotient of the customer identifier of the first PDU and the length of the new bitmap and sets the base value of the new entry to a product of the integer quotient and the length of the new bitmap.

20. The network switch of claim 18,
wherein, to identify the bit of the new bitmap, the VLAN learning module computes an integer remainder of the customer identifier of the first PDU and the length of the new bitmap, wherein the integer remainder specifies a position of the bit of the new bitmap for the customer identifier of the first PDU.

21. The network switch of claim 18,
wherein the virtual switch computes an integer quotient of the customer identifier of the first PDU and the length of the new bitmap and determines the new entry in the L2 learning table for the first PDU by matching the service identifier of the first PDU to the service identifier included in the new entry and by matching a product of the integer quotient and the length of the new bitmap to the base value included in the new entry,
wherein the virtual switch identifies a bit of the new bitmap for the customer identifier of the first PDU by computing an integer remainder of the customer identifier of the second PDU and the length of the new bitmap,
wherein the virtual switch filters the first PDU upon determining the identified bit of the new bitmap for the customer identifier of the first PDU indicates the customer identifier of the first PDU is not learned, and
wherein the virtual switch switches the first PDU to the one of the interfaces associated with the new entry upon determining the identified bit of the new bitmap for the customer identifier of the first PDU indicates the customer identifier of the first PDU is learned.

22. The network switch of claim 18,
wherein one of the interfaces receives a third PDU, wherein the third PDU includes both a service identifier identifying a SVLAN and a customer identifier identifying a CVLAN,
wherein the VLAN learning module computes an integer quotient of the customer identifier of the third PDU and the length of the new bitmap;
wherein the VLAN learning module determines the new entry in the L2 learning table for the third PDU by matching the service identifier of the third PDU to the service identifier included in the new entry and by matching a product of the integer quotient and the length of the new bitmap to the base value included in the new entry,
wherein the VLAN learning module identifies a bit of the new bitmap for the customer identifier of the third PDU by computing an integer remainder of the customer identifier of the third PDU and the length of the new bitmap, and
wherein the VLAN learning module modifies the bit of the new bitmap for the customer identifier of the third PDU to indicate both the service identifier and customer identifier of the third PDU is learned within the L2 learning table.

23. A non-transitory computer-readable medium comprising instructions for causing one or more programmable processors to:
store data defining a layer two (L2) learning table with a network switch positioned between one or more aggregation network devices and a service provider network device, wherein the L2 learning table includes a plurality of entries, each of the entries including a service identifier identifying a service virtual local area network (SVLAN) and also including a bitmap having bits representing a range of customer identifiers identifying respective customer virtual local area networks (CVLANs) associated with the SVLAN, wherein each of the bits of the bitmap indicates whether a corresponding CVLAN and SVLAN has been learned and authenticated, and wherein each of the entries of the L2 learning table is associated with a core-facing interface of one of the one or more aggregation network devices;
receive, by a receiving core-facing interface of one of the aggregation network devices, a first PDU that includes a service identifier identifying an SVLAN of the first PDU and a customer identifier identifying a CVLAN of the first PDU;
access the L2 learning table to determine whether any one of the entries of the L2 learning table includes the service identifier and also includes a bitmap having bit representing a range of customer identifiers that include the customer identifier of the first PDU; and
based on the determination that none of the entries of the L2 learning table includes the service identifier and also includes a bitmap having bits representing a range of customer identifiers that include the customer identifier of the first PDU, update the L2 learning table to create a new entry in the L2 learning table that includes the service identifier of the first PDU and also includes a bitmap having bits representing a range of customer identifiers that include the customer identifier of the first PDU, wherein the new entry defines an association with the receiving core-facing interface without storing an association between an L2 address included within the first PDU and the receiving core-facing interface;
receive a second packet data unit (PDU) from the service provider network device, wherein the second PDU includes both a service identifier identifying an SVLAN of the second PDU and a customer identifier identifying a CVLAN of the second PDU;
switch the second PDU when a corresponding bit of the L2 learning table for the SVLAN and CVLAN of the second PDU indicates the CVLAN and SVLAN of the second PDU has been learned and authenticated; and filter the second PDU when the corresponding bit of the L2 learning table for the SVLAN and CVLAN of the second PDU indicates the CVLAN and SVLAN of the second PDU has not been learned and authenticated.

\* \* \* \* \*